United States Patent [19]

Sanmugam

[11] Patent Number: 5,734,977
[45] Date of Patent: Mar. 31, 1998

[54] FRAUD DETECTION IN RADIO COMMUNICATIONS NETWORK

[75] Inventor: K. Raj Sanmugam, Guildford, England

[73] Assignee: Telefonaktiebolaget LM Ericsson, Stockholm, Sweden

[21] Appl. No.: 336,988

[22] Filed: Nov. 10, 1994

[51] Int. Cl.$^6$ .............................. H04M 11/00; H04Q 7/00
[52] U.S. Cl. ............................................. 455/410; 455/435
[58] Field of Search ............................... 379/59, 58, 60, 379/62; 455/33.1, 54.2, 50.1, 410, 435, 424, 411, 433

[56] References Cited

U.S. PATENT DOCUMENTS

| | | | |
|---|---|---|---|
| 4,776,000 | 10/1988 | Parienti | 379/62 |
| 4,811,377 | 3/1989 | Krolopp et al. | 379/62 |
| 4,829,554 | 5/1989 | Barnes et al. | 379/58 |
| 4,843,385 | 6/1989 | Borras | 340/825.32 |
| 4,955,049 | 9/1990 | Ghisler | 379/58 |
| 5,091,942 | 2/1992 | Dent | 380/46 |
| 5,148,472 | 9/1992 | Freese et al. | 379/59 |
| 5,204,902 | 4/1993 | Reeds III et al. | 380/23 |
| 5,210,787 | 5/1993 | Hayes et al. | 379/60 |
| 5,241,598 | 8/1993 | Raith | 379/59 X |
| 5,247,698 | 9/1993 | Sawyer et al. | 455/33.1 |
| 5,309,501 | 5/1994 | Kozik et al. | 379/58 |
| 5,335,265 | 8/1994 | Cooper et al. | 379/60 X |
| 5,345,595 | 9/1994 | Johnson et al. | 379/60 X |
| 5,420,908 | 5/1995 | Hodges et al. | 379/58 |
| 5,420,910 | 5/1995 | Rudokas et al. | 455/33.1 X |
| 5,448,760 | 9/1995 | Frederick | 455/56.1 |
| 5,467,382 | 11/1995 | Schorman | 379/58 |
| 5,497,412 | 3/1996 | Lannen et al. | 379/59 X |
| 5,517,555 | 5/1996 | Amadon et al. | 379/59 |
| 5,535,431 | 7/1996 | Grube et al. | 455/54.2 X |
| 5,588,042 | 12/1996 | Comer | 379/58 X |

FOREIGN PATENT DOCUMENTS

| | | |
|---|---|---|
| 0497203A2 | 8/1992 | European Pat. Off. . |
| 0544449A1 | 6/1993 | European Pat. Off. . |
| WO 91/13522 | 9/1991 | WIPO . |
| WO 93/09640 | 5/1993 | WIPO . |
| WO 94/11959 | 5/1994 | WIPO . |

OTHER PUBLICATIONS

Telecommunications Industry Association, TR–45.2 Subcommittee, Working Group IV, Kirk Carlson (source); "A Proposal For Fraud Management Stage 2", Feb. 7, 1994, Orlando, Florida, pp. 1–28.

Telecommunications Industry Association, TR–45.2 Subcommittee, Working Groups II and III, Ed Tiedemann (source); "Location Formats", May 3–7, 1993, Downer's Grove, IL, pp. 1–6.

Telecommunications Industry Association, TR–45.2 Subcommittee, Working Group II, Kirk Carlson (source);"Proposed Baseline Text For Report On Network Based Fraud Management", Sep. 22, 1992, Seattle, WA, pp. 1–35.

Telecommunications Industry Association, TR–45.2 Subcommittee, Working Group II; "Report On Network Based Fraud Management", Sep. 22, 1992, Walnut Creek, CA, pp. 1–35.

Telecommunications Industry Association, TR–45.2 Subcommittee, Working Group II, Steve Donovan and Kirk Carlson (sources); "Proposed Baseline Text For Report On Network Based Fraud Management"; Aug. 18, 1992, Seattle, WA, pp. 1–35.

(List continued on next page.)

*Primary Examiner*—Allen R. MacDonald
*Assistant Examiner*—Scott Richardson
*Attorney, Agent, or Firm*—Robert A. Samra

[57] ABSTRACT

A method for detecting fraud in a cellular radio telephone system. Fraud is suspected when the system detects a multiple access from a mobile station, when an activity collision occurs, when the system receives a premature registration from the mobile station, when auditing or operator-initiated locating of the mobile station reveals the existence of the mobile station in two locations simultaneously, or when tracing of mobile subscriber activity reveals unusual activity.

24 Claims, 12 Drawing Sheets

OTHER PUBLICATIONS

Telecommunications Industry Association, TR-45.2 Subcommittee, Working Group II, Steve Donovan (source); "Proposed Baseline Text For Report On Network Based Fraud Management", May 18, 1992, Atlanta, GA, pp. 1-1 to 17-2.

Telecommunications Industry Association, TR-45.2 Subcommittee, Working Group II, Rob Mechaley and Kirk Carlson (sources); "Report On Network Based Fraud Management", Jan. 28, 1992, San Diego, CA, pp. 1-20.

Telecommunications Industry Association, TR-45.2 Subcommittee, Working Group II, GTE Telecommunications Services, Inc. (source); "Fraud Detection", Sep. 30-Oct. 3, 1991, Orlando, Florida, pp. 1-2.

Telecommunications Industry Association, TR-45.2 Subcommittee, Working Group II, NovAtel Communications Limited (source); "Velocity Check Methodologies", Sep. 30, 1991, pp. 1-4.

Telecommunications Industry Association, TR-45.2 Subcommittee, Working Group II, Rob Mechaley and Kirk Carlson (sources); "Parameters For Fraud Management Using Network Based Techniques", Sep. 30, 1991, pp. 1-11.

Telecommunications Industry Association, TR-45.2 Subcommittee, Working Group II, Rob Mechaley and Kirk Carlson (sources); "Fraud Management Using Network Based Techniques", Jun. 24, 1991, Toronto, Ontario, pp. 1-8.

William C. Y. Lee, Mobile Cellular Telecommunications System, McGraw-Hill Book Co., pp. 79, 82 and 83, 1989.

FRAUD DETECTION IN RADIO COMMUNICATIONS NETWORK

BACKGROUND OF THE INVENTION

This invention relates to wireless communications systems and, more particularly, to a method and system for fraud detection and supervision in a cellular radio telephone system.

Historical Perspective

The cellular mobile telephone system, a technology that took over forty years to conceive, develop and deploy, was launched in North America in the early 80s. The first American commercial cellular system went into operation in Chicago in 1983. By the late 1980s, cellular systems were operational in virtually every major metropolitan area in the United States. At present, the industry enjoys tremendous growth spurred by the decline in the costs of cellular phones and the fees for cellular service subscription. The future looks even brighter as the industry adopts new spectrum efficient digital technologies to solve the problems of lack of system capacity and high operational costs (cost of infrastructure equipment per subscriber). The potential of these new technologies for providing evolutionary and invaluable communication services (e.g., data transmission for the "mobile office") is likely to attract millions of new subscribers.

Unfortunately, the booming cellular industry has also attracted alarming numbers of criminals and hackers who are draining profits from the industry and abusing the legitimate subscribers. Accurate estimates on the inflicted monetary loss are difficult to obtain. The consensus, however, is that the cost of cellular fraud may amount to billions of dollars for the entire industry if left unchecked. A general discussion of cellular fraud and the resultant revenue and service losses appears in the article entitled "Cellular Fraud" by Henry M. Kowalczyk in *Cellular Business*, dated March 1991, at 32–35. Further background on the subject can be found in the article entitled "Spoofers can Defraud Users and Carriers" by Geoffrey S. Goodfellow et al., in *Personal Communications Technology*, dated November 1985.

Historically, the development of some of the modern communication techniques, such as digital time division and spread spectrum radio transmission, have been heavily influenced by the security and privacy concerns of the early communication system designers, particularly in the military arena. By contrast, the early analog cellular telephone system designers did not consider security related concerns as important as the other aspects of the wireless communication, e.g., voice quality. At the same time, the regulating government authorities, e.g., the Federal Communications Commission (FCC), considered the airwaves, for the most part, to be "public property." The result is that, with some exceptions, everyone has enjoyed the right to tune to and pick up any radio signal. Encouraged by this freedom and the curiosity of the general public, an "eavesdropping" industry has emerged marketing openly a wide range of scanners that can monitor the airwaves.

However, as more and more cellular systems were deployed and the subscriber base grew, concerns over the lack of security measures in the existing analog cellular telephone systems began to surface. These concerns have centered not only on the lack of voice privacy, but also on the widespread ability to steal cellular service. In recent years, the industry has witnessed a significant increase in the number of mobile stations gaining access to cellular services by illegally identifying themselves as legitimate subscribers. These illegal activities are possible, in large part, due to certain limitations of existing cellular systems which are best understood after a brief description of the structure and operation of a typical cellular system.

Typical Cellular System

Conventional cellular phone systems are implemented by dividing the system service area into physical cells. Typically, each cell may be of a size from a few city blocks to 30 miles in radius. Each cell is served by a dedicated base station which communicates with the system through an exchange known as a mobile switching center (MSC). Calls are made to and received from the system by individual mobile stations (portable, transportable or vehicular radio telephone units) via these base stations. As each individual mobile station moves from cell to cell, or "roams" from system to system, it is served by the particular base station which covers the cell in which the mobile station is then located. Each of the base stations in the system has at least one dedicated control channel through which the system coordinates service. The other radio channels at the base station are used for voice conversations. Each of the control and voice channels is full-duplex (two-way) in nature and consists of a forward frequency channel from the base station to the mobile station and a reverse frequency channel from the mobile station to the base station.

In order to route incoming calls to a mobile station, the location of the mobile station must be known to the system. To facilitate the locating of mobile stations, a cellular phone system service area may be divided into "location areas" each of which consists of one or more cells. A cellular phone system tracks the location of the mobile station in any location area through the process of "registration." In registration, a mobile station transmits a registration request message on the reverse control channel to which it has tuned (generally that of the base station nearest to its location). If the registration request is accepted, the base station will transmit a registration confirmation message on the forward control channel to the mobile station. This confirmation message confirms that the system has registered the mobile station in the location area containing the cell which that base station serves. Registration can be either time-based or location-based.

Time-based or periodic registration occurs independently of other activities of the mobile station and is performed periodically at predefined time intervals. The system periodically transmits certain registration time constants in an overhead message train (OMT) on the forward control channels of the base stations serving the cells in which the mobile units happen to be located. The mobile units then transmit registration request messages to the system, as they move about the system, at time periods calculated by the mobile station according to these time constants. The registration request message is received by the system at the base station serving the cell in which a particular mobile unit is located at the time of transmission. Upon receipt of the registration request message, the system registers that particular mobile in the location area containing the cell of the base station which received the registration request, and that base station will transmit a registration confirmation message back to the mobile station.

Location-based registration occurs as a result of a mobile station moving from one location area to another and/or from one system area to another. Each base station will periodically transmit in the OMT data identifying the location area and/or system in which the base station is located.

A mobile station periodically scans the control channels as it moves throughout the system and, by tuning to the control channel with the strongest signal strength, receives the location area and/or system identifying data for the location area and/or system in which it is then located. The mobile station compares the latest received location area and/or system identifying data with data in its memory identifying the last location area and/or system from which it received a registration confirmation message. If the corresponding sets of identifying data match, the mobile is located in the location area and/or system in which it is currently registered. However, if the mobile station has moved to a new location area or system and, hence, the sets of data do not match, the mobile will transmit a registration request message which is received at the base station serving the cell contained in the new location area and/or system in which it is now located. The system will then register the mobile station in this new location area and/or system and send a registration confirmation to the mobile station.

The mobile station can access the system to make a call at any time by transmitting an originating call access request. The call access request is received by the base station serving the cell in which the mobile station is then located. The system will then register the mobile station in the relevant location area (i.e., call originations are treated like registrations for location identification purposes) and transmit an initial voice channel designation message (IVCD) for an analog voice channel, or an initial digital traffic channel message (IDTC) for a digital voice channel, to assign the mobile to an available voice channel. When the system receives an incoming call for a mobile station, the system will send a paging message over the control channels of the location area in which the mobile is registered. The mobile responds by transmitting a page response message back to the system. Upon receipt of the page response message from the mobile, the system will assign an available voice channel to the mobile by transmitting an IVCD or IDTC message.

Subscriber Identification and Validation

In current analog systems, several information elements are used to identify and validate a legitimate subscriber. These elements include the mobile identification number (MIN), which identifies the service subscription, and the electronic serial number (ESN), which identifies the mobile station. In the United States, the MIN is a digital representation of the area code and directory telephone number of the mobile subscriber (i.e., the MIN is a digital representation of NPA/NXX-XXXX, where NPA is a 3-digit number identifying the numbering plan area in which the cellular system is located, NXX is a 3-digit number identifying the cellular operator and the mobile exchange, and XXXX is a 4-digit number which identifies an individual mobile subscriber). The MIN is assigned by the service provider (cellular operator) and is usually programmed into a mobile station either when purchased by the original user or when sold to another user. The ESN is supplied by the mobile manufacturer and is intended to uniquely identify a mobile station to any cellular system and to allow the automatic detection of stolen mobiles for which service can be denied permanently. According to the analog air interface industry standard known as EIA-553, the ESN must be "factory-set and not readily alterable in the field." Furthermore, the circuitry that provides the ESN must be isolated so that it is tamper-proof and any attempt to alter the ESN circuitry should render the mobile inoperative.

Besides the MIN and ESN, each mobile station is also identified by a station class mark (SCM) which designates the transmit power class, mode and bandwidth for the mobile station. Mobile stations in different power classes (portable, transportable or vehicular) will transmit at one of several specified power levels within different output power ranges (0.6, 1.6 or 4.0 Watts). The transmit power level within a given range can be increased or decreased by a power change command from the base station. Furthermore, some mobile stations have the ability to operate in a "discontinuous" transmission (DTX) mode in which they can switch autonomously between two transmitter power level states ("DTX high" and "DTX low"). In addition, some mobile stations are set to operate within only the "basic" frequency range initially allocated to cellular systems while others are also set to operate in the "extended" frequency range which was later allocated. Like the MIN and ESN, the relevant SCM information is stored in each mobile station.

User authorization for cellular service is usually performed at every system access (e.g., registration request, call origination or page response) by a mobile station. When making an access, the mobile station forwards the MIN, ESN and SCM to the system. Each exchange maintains a "white list" containing the MIN/ESN pairs of the valid subscribers and a "black list" containing the ESNs of stolen or otherwise unauthorized mobile stations. The system validates the received MIN to ensure that it belongs to a known subscriber and compares the received ESN with the one stored in the system in association with the MIN. If these validations are successful, the user is considered legitimate and the access is accepted. Service is then provided and controlled according to the received SCM information.

Cellular Fraud

Unauthorized access to a cellular system is possible because of the ability to fraudulently obtain or generate mobile identification information (MIN/ESN) which is then used to "fool" the system into providing service. There are many ways in which valid MIN/ESN information can fall into the hands of a cellular service thief. Since the MIN/ESN is transmitted over the air by each mobile unit at access, it is easily accessible to anyone with the proper scanning equipment. In addition to radio interception, there are much simpler means to obtain the identification information. For example, there are reports of off-the-shelf ESN chips, ESN bulletin boards, and of employees of cellular service shops, who have access to the MIN/ESN information, selling this information.

The tools of the trade for the cellular thief may also vary. Some of the mobile stations being sold today do not comply with the tamper-proof requirement for ESN and, consequently, these mobiles can be easily programmed with a new ESN (there is no tamper-proof requirement for MIN and, hence, all mobile stations are easily programmed with a new MIN). There are also reports of so-called "doctored" phones that are programmed to either automatically scan the reverse control channel and capture the identification information, or to use a different MIN/ESN identity at every access. Other reports have described "cellular cache boxes" operating on computers which are automating fraud.

Fraud control solutions based on encryption and authentication schemes are being introduced for the next generation "dual-mode" (combined analog and digital) systems as specified in the industry standard known as IS-54. Similar functionality is to be supported by a revision of the EIA-553 standard for analog systems. For the existing analog mobile station population, a number of security measures have been used to counteract the problem of unauthorized access. These measures have had varying degrees of success depending on the form of fraud in question. To date, the following fraud techniques have been identified: subscription fraud, roaming fraud, tumbling fraud, cloning fraud, and channel grabbing (or hijacking) fraud.

Subscription Fraud

Subscription fraud is one of the earliest forms of fraud. The perpetrator obtains a service subscription using false personal identification information (fake name, address, etc.). This form of fraud is discovered when carriers fail to receive payments for the services. Although this form of fraud is most difficult to detect, the solution is rather simple. Cellular carriers and/or their sales agents can authenticate subscriber identity prior to issuance of subscription.

Roaming Fraud

Roaming fraud was made possible by the roaming agreements between cellular carriers operating different systems. These agreements allow a subscriber to roam outside of his/her subscription ("home") area and conveniently receive services in a cooperating ("visited" or "serving") system area. In order to receive service in the visited area, each subscriber qualifying under a roaming agreement was issued a temporary roaming number from the number series used in the visited area. Callers wishing to reach the subscriber while roaming in the visited area could dial the temporary roaming number and be connected to the roamer by the exchange in the visited system. Calling privileges were generally made available to the roamer after placing his first call in the visited area. This first call was usually routed to an operator who verified the eligibility of the roamer to receive service (e.g., roaming number, credit card number, etc.).

A fraudulent mobile subscriber could obtain roamer service by illegally obtaining the roaming number of a legitimate subscriber. Armed with this information, the fraud perpetrator could, for example, program his mobile station with the roaming number, have a call placed to this number and a voice channel assigned to the mobile station, and then issue a third party service request over the voice channel requesting connection to a desired phone number. To the visited system, the fraudulent subscriber appeared as a legitimate roamer from another system. Because of the lack of intersystem communication facilities between the visited system and the home system of the legitimate roamer, information concerning roaming subscribers (e.g., their MIN/ESN identity) was not readily available to the visited system. Lacking a proper validation means, the serving system accepted all roamer calls so as not to deny service to legitimate roaming subscribers. Again, this form of fraud was normally discovered only when the legitimate subscriber detected discrepancies in the service bills.

The industry has successfully reduced the roaming type of fraud to a manageable level by installing subscriber identification validation systems, such as a central clearing house, and updating the switching systems (MSCs) with instantaneous roamer validation facilities. The early validation systems, however, were too slow (i.e., did not operate on a "real time" basis). Consequently, and in order not to risk denial of service to a legitimate subscriber, the strategy used was to accept the first call from a roamer and then initiate an identification verification process, either through the clearing house or some other means (e.g., the home exchange). If the validation fails then the associated ESN could be placed on a "barring list" to deny access permanently. Otherwise, all subsequent accesses associated with that ESN were accepted without contention.

These anti-roaming-fraud systems typically worked as follows: On call origination from a roamer, the serving mobile exchange sent (e.g., by X.25 signalling) the MIN/ESN pair received from the mobile station to the home exchange of the roamer or to a clearing house and requested verification. To avoid denying service to a valid roamer, the MIN/ESN pair was initially assumed to be valid and this first call from the roamer was allowed to proceed pending the outcome of the verification request. The home exchange or the clearing house compared the MIN/ESN pair received from the serving exchange to a list of valid MIN/ESN pairs and reported to the serving exchange. If the MIN/ESN pair was not verified by the home exchange or the clearing house, as applicable, the serving exchange disconnected any call-in-progress and blacklisted the corresponding ESN (blacklisting the corresponding MIN for other than a short period of time, e.g., a few hours, would have risked denial of service to the valid MIN holder).

Because of signalling and processing time delays in obtaining the reply to the verification request, however, a fraudulent roamer could enjoy several minutes or, in some instances, several hours of free calling before being disconnected. Newer cellular systems will support so-called "automatic roaming" (no operator intervention) and will be connected with "real time" signalling links operating according to a common signalling protocol, e.g., S.S. 7 or IS-41 protocol. In these systems, the validation of a roamer MIN/ESN through the home exchange is virtually instantaneous.

Tumbling Fraud

Tumbling fraud is actually an advanced form of the roamer fraud technology that emerged to circumvent the roamer fraud control solutions deployed by the switching systems. The tumbling concept took advantage of the "post-first-call" validation limitation by changing (tumbling) the ESN, the MIN, or both the ESN and MIN after placing one or more successful roamer calls with the first MIN/ESN combination. A fraudulent mobile subscriber using MIN/ESN tumbling selected a roamer MIN (a MIN in which the NPA/NXX belonged to a carrier which had a roaming agreement with the local carrier) and a random ESN to generate a MIN/ESN pair and make at least one call until the selected ESN value is barred through verification, at which time another MIN or ESN value was selected and another call could be made.

A typical MIN/ESN tumbling scenario would proceed as follows: A perpetrator would first place a successful roamer call. Since it took some time for the serving system to validate the roamer identity, the perpetrator could escape with at least a few free calls. If the roamer validation was successful, the roamer identity could be used repeatedly until service was denied. At that point, the perpetrator would request services by changing the MIN. If the ESN becomes barred, the perpetrator would change to another ESN and then another MIN and so on. The MIN/ESN tumbler, therefore, was capable of changing its identity at every access, making every call look like a first call from a roamer.

Initial solutions to tumbling fraud included removing abused NPA/NXX combinations from system use, pre-call validating of ESN for format conformation, diverting roamer calls to an operator (0+ dialling), and even eliminating roaming agreements. As a long term solution, the industry has sought to expedite the exchange of subscriber and call information between switching systems through the development of a common intersystem communication protocol, such as that specified in the industry standard known as IS-41.

Cloning Fraud

Cloning fraud occurs when a perpetrator programs a duplicated mobile station with the identity of a legitimate mobile station. Service requests from this cloned mobile station will pass the user authorization procedures of the current analog system. Fraudulent mobiles that are permanently programmed with a particular identification, or that have the capability to automatically adopt any identity when making calls (i.e., the so-called "doctored" phones), fall into this fraud category.

It should be observed that, from a system point of view, when a mobile illegally gains access, regardless of the specific fraud technique being used, the mobile has adopted the identity of a valid subscriber. Thus, all of these fraudulent mobiles could be considered clones. At present, there is no known switch-based solution for this form of fraud.

Hijacking Fraud

Hijacking or channel grabbing fraud occurs when a perpetrator "grabs" a voice channel which is being used for a conversation involving a legitimate subscriber. The hijacker usually scans the frequencies in the cellular system to find an active voice channel being used for a call by a valid mobile station. The hijacker then tunes to this voice channel and "overpowers" the valid mobile station by increasing the transmit output power of the hijacker's mobile station. At this point, the hijacker has effectively taken over the voice communication with the base station and can issue a third party service request to obtain a connection to a desired phone number (this is normally done by pressing a button on the mobile station keypad to send a hook flash during a call). The base station will interrupt the call and connect the hijacker to the desired number (meanwhile, the legitimate mobile subscriber terminates the prior call because of the interruption). Again, there is no known switch-based solution for this form of fraud.

Fraud Summary

From the foregoing discussion, it can be seen that there are several dimensions to the fraud problem: The availability of mobile identification information, the mobile manufacturers' lack of compliance with the security related standards, the switching systems' inability to exchange subscriber/call related information, and the issuance of subscriptions without sufficient credit/identity checks. From a technology standpoint, long term solutions to these problems are not beyond reach. Having the mobile manufacturers comply with the security requirements would make it difficult, if not impossible, to alter a mobile's identity in the field. Encryption and authentication schemes, such as the one used in the dual-mode standard (IS-54), will make it difficult to access the mobile's identification information off the airwaves. The current analog specification (EIA-553) is also being revised to include security related functions. Furthermore, with the implementation of IS-41, dissimilar systems should be able to exchange subscriber/call related information and validate subscriber authenticity. In addition, future mobile communication systems are likely to become "more intelligent" (i.e., enhanced with anti-fraud measures) to detect, deter and prevent fraud.

Today, however, there are over fifteen million analog mobile stations in North America alone. The long term solutions mentioned above will bear fruit only when the mobile stations are also modified to adhere to the technical requirements of these solutions. Thus, while newer mobile stations become more secure, an interim switch-based solution is required to counter the threat of unauthorized accesses by the existing analog mobile population, while avoiding the need to recall and upgrade these mobiles. The present invention provides this solution by detecting anomalies in subscriber behavior which may indicate fraud. The indications of fraud are reported to the operator and repeated indications of fraud may result in the denial of service requests from the suspected fraudulent mobile stations.

SUMMARY OF THE INVENTION

The present invention provides a method for detecting fraud in a radio communications system communicating with a plurality of mobile stations over a plurality of radio frequency (RF) channels, each of the mobile stations transmitting mobile identifying data when accessing the system and each of the RF channels being designated by channel identifying data. The method comprises the steps of receiving at the system a first system access over a first RF channel; receiving at the system a second system access over a second RF channel, the second system access having the same mobile identifying data as the first system access; comparing the channel identifying data for the first and second RF channels; and detecting fraud if the channel identifying data for the first and second RF channels do not match.

In another aspect, the present invention provides a method for detecting fraud in a cellular radio telephone system including an exchange in communication with a plurality of mobile stations over a plurality of radio frequency (RF) channels including at least one voice channel and at least one control channel. The method comprises the steps of receiving at the exchange a system access over a control channel of the system; identifying which mobile station is making the system access; determining whether the identified mobile station is indicated to be currently connected to a voice channel of the system; verifying whether the identified mobile station is still connected to the voice channel; and detecting fraud if the identified mobile station is verified to be connected to the voice channel.

In yet another aspect, the present invention provides a method for detecting fraud in a radio communications network comprised of a plurality of systems serving a plurality of mobile stations. The method comprises the steps of receiving at one of the systems a request for service from one of the mobile stations; determining whether the mobile station is indicated to be actively receiving service in another one of the systems; and detecting fraud if the mobile station is determined to be active in another one of the systems.

In still another aspect, the present invention provides a method for detecting fraud in a cellular network including a plurality of mobile stations subscribing service from a home system and capable of receiving service in a plurality of other systems, the home system maintaining a register of which systems are currently serving the mobile stations. The method comprises the steps of receiving at the home system a notification that one of the other systems has received a service request from one of the mobile stations; determining at the home system whether the other system which received the service request is the same as the system which is registered to be currently serving the mobile station; if the other system is different from the registered system, sending from the home system to the registered system an order cancelling service to the mobile station; determining at the registered system in response to the receipt of the order the current activity status of the mobile station; if the mobile station is indicated to be currently active in the registered system, confirming that the mobile station is still active in the registered system; and detecting fraud if the mobile station is confirmed to be still active in the registered system while also being active in the other system.

In a further aspect, the present invention provides a method for detecting fraud in a radio communications system in which a plurality of mobile stations register with the system at predefined time intervals. The method comprises the steps of determining the actual time interval between two registrations received by the system from a particular mobile station; comparing the actual time interval with the predefined time interval between the two registrations; and detecting fraud if the actual time interval between the two registrations is less than the predefined time interval.

In a yet further aspect, the present invention provides a method for detecting fraud in a radio communications system in which a mobile station periodically registers with the system. The method comprises the steps of storing the time at which a first registration from the mobile station was received by the system; estimating the time of arrival at the system of a second registration from the mobile station; measuring the actual time of arrival at the system of the second registration from the mobile station; comparing the estimated time of arrival with the actual time of arrival of the second registration; and detecting fraud if the actual time of arrival is less than the estimated time of arrival for the second registration.

In a still further aspect, the present invention provides a method for detecting the existence of a fraudulent mobile station. The method comprises the steps of registering a mobile station in a first location; receiving a system access from the mobile station in a second location; auditing the mobile station in the first location; and detecting the existence of a fraudulent mobile station if the auditing reveals the existence of the mobile station in the first location while the system access was received in the second location.

The present invention also provides a method for locating a mobile station suspected of fraud in a radio communications network. The method comprises the steps of selecting an area to be searched for the mobile station; issuing an audit order in the area for the mobile station; detecting an answer to the audit order from the mobile station; and determining the location of the mobile station based upon the location from which the answer was detected.

Furthermore, the present invention provides a method for detecting fraudulent activities associated with a mobile station. The method comprises the steps of marking the mobile station for activity reporting; reporting the activities of the mobile station over a predetermined period of time or in a predetermined geographic region; and analyzing the reported activities to determine whether there are fraudulent activities from other mobile stations having the identity of the mobile station.

BRIEF DESCRIPTION OF THE DRAWINGS

For a more detailed understanding of the present invention and its objects and advantages, reference can now be had to the following description taken in conjunction with the accompanying drawings in which.

DETAILED DESCRIPTION OF THE INVENTION

Figure 1:
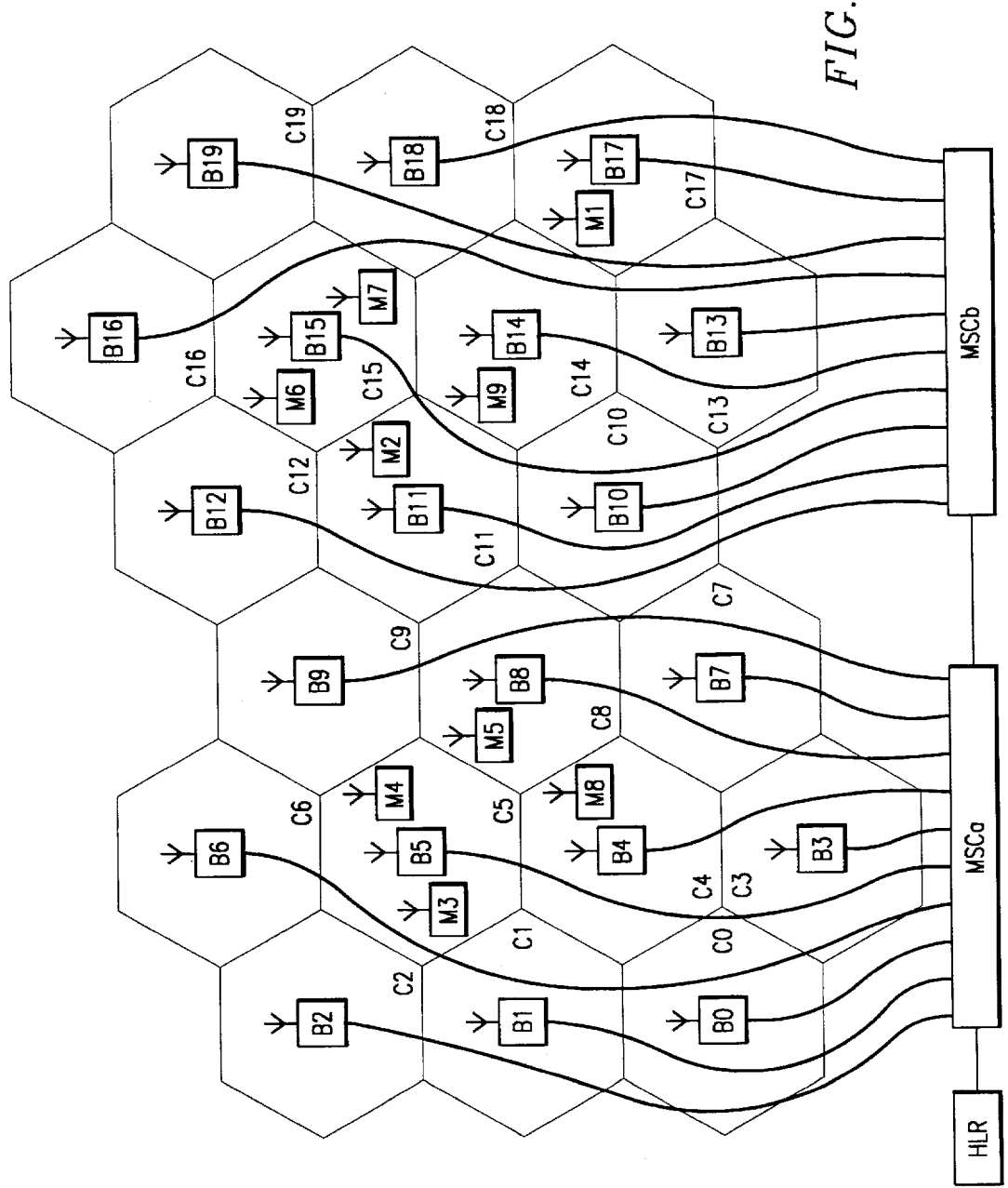
FIG. 1 is a pictorial illustration of a conventional cellular radio communication network.

Referring to FIG. 1, there is illustrated a conventional cellular radio communication network of the type to which the present invention generally pertains. The network includes two exchanges or mobile switching centers MSCa and MSCb which may control different parts of a single cellular system operated by the same licensed carrier, or different (but, in this example, contiguous) systems operated by different licensed carriers. MSCa is connected to and controls a first plurality of base stations B0–B9 which provide radio coverage for cells C0–C9, respectively, while MSCb is connected to and controls a second plurality of base stations B10–B19 which provide radio coverage for cells C10–C19, respectively. The relevant connections which can be used between the MSCs and the base stations are well known in the art and include analog links and digital T1 lines. Each of the base stations B0–B19 includes a controller and at least one radio transceiver connected to an antenna as is well known in the art. The base stations B0–B19 may be located at or near the center or periphery of the cells C0–C19, respectively, and may illuminate the cells C0–C19 with radio signals either omni-directionally or directionally. While the network of FIG. 1 is illustratively shown to include 2 MSCs and 20 base stations, it should be clearly understood that, in practice, the number of MSCs or base stations may vary depending on the application.

With continuing reference to FIG. 1, a plurality of mobile stations M1–M9 may be seen within certain of the cells C0–C19. Thus, for example, mobile station M1 is located in cell C17 which is in the service area of MSCb, while mobile stations M3 and M4 are located in cell C5 which is in the service area of MSCa. Again, although only 10 mobile stations are shown in FIG. 1, it should be understood that the actual number of mobile stations may be much larger in practice. Moreover, while no mobile stations are shown in some of the cells C0–C19, the presence of absence of any mobile stations in any of the cells C0–C19, or any part thereof, should be understood to depend in practice on the individual desires of the mobile subscribers who may roam from one location in a cell to another or from one cell to an adjacent cell or neighboring cell, and even from the service area of MSCa to the service area of MSCb, or vice versa.

Each of the mobile stations M1–M9 is capable of making or receiving telephone calls or communicating data through the nearest of the base stations B0–B19. The base stations relay the calls or data to the mobile exchange MSCa or MSCb which is connected to the landline public switched telephone network (PSTN) or another fixed network, e.g., an integrated services digital network (ISDN). For the sake of simplicity, the connections between the exchanges MSCa or MSCb and the PSTN or ISDN are not shown in FIG. 1, but are well known to those of ordinary skill in the art.

Call connections among the mobile stations M1–M9 and landline telephones are established by the exchanges MSCa and MSCb. Each of the exchanges controls communications between its associated base stations and the mobile stations located in its service area. For example, MSCa controls the paging of a mobile station believed to be in one of the cells C0–C9 served by the base stations B0–B9 in response to the receipt of a call for that mobile station, the assignment of a radio channel to the mobile station by a base station upon the receipt of page response from the mobile station, as well as the handoff of communications with a mobile station from one base station to another in response to the mobile station travelling from cell to cell within the service area of MSCa.

The mobile stations M1–M9 qualify for service with MSCa or MSCb if they are either "home" subscribers or valid "roamers" from a cooperating system. If, in FIG. 1, MSCa and MSCb are in different systems operated by different cellular carriers, the home subscribers for purposes of MSCa, for example, are those subscribers which subscribe service from the operator of the system which includes MSCa. Thus, if M1 and M3 subscribe service from the system of MSCa, both are home subscribers for purposes of MSCa, and M1, which is shown to be roaming in cell C17 within the service area of MSCb, is a roamer for purposes of MSCb. Each exchange maintains a home subscriber database either internally or in a home location register (HLR) which is connected to the exchange. The HLR stores subscriber records which contain identification and location information, activity status (e.g., busy, idle, power turned off, roaming, etc.) and a service profile for each home subscriber. Similar visitor records, including an identification of the home system, are temporarily kept for each roamer which registers with the exchange (e.g., through the process of system area registration described earlier). The visitor records are cancelled when the roamers register in another system.

In the early cellular systems, the exchanges completed incoming calls to mobile stations located in their respective service areas by paging the called mobile station in each of the cells comprising these areas. To avoid occupying system resources unnecessarily, newer systems limit paging to a smaller "location area" which includes the cell where the mobile station last registered. Thus, in FIG. 1, the cells C0–C19 may be divided into a plurality of location areas each of which includes at least one cell. Mobile stations moving from one location area to another will transmit a registration message and the system will register the mobile station in the new location area (e.g., through the process of location area registration described earlier). The mobile station may then be paged in the current location area in order to successfully complete a call.

Each of the cells C0–C19 is allocated a subset of the radio frequency (RF) channels which are available for use in the system. Each RF channel is identified by a channel number (CHN) and is full duplex, i.e., consists of a pair of frequencies, a froward frequency which is used for transmissions from a base station to a mobile station, and a reverse frequency which is used for transmissions from the mobile station to the base station. One of the RF channels in each cell, called the "control" channel, is used for signalling and supervisory communications, and the remaining RF channels are used for voice communications.

While in the idle state, the mobile stations M1–M9 continuously monitor the control channel of a nearby cell and periodically scan all the available control channels in the system to locate the control channel with the highest signal strength. When a call is made or received by a mobile station listening to the control channel of a given cell, the MSC will assign an available voice channel in that cell and order the mobile station to leave the control channel and tune to the assigned voice channel where conversation can take place.

The RF channels (channel numbers) assigned to one cell may be reused in a distant cell in the system in accordance with a frequency reuse pattern as is well known in the art. For example, cells C3 and C6 may use a common group of RF channels (co-channels). To avoid capture of a base station by a mobile station listening to the control co-channel at a distant base station, each control channel is identified by a digital color code (DCC) which is transmitted from the base station and looped back by the mobile station (a similar code is used for the voice channels). The base station will detect capture by an interfering mobile station when the DCC received from the mobile station does not match the DCC transmitted by the base station.

The forward control channel normally carries system overhead information including system identification, location area identification and periodic registration information, as well as mobile-specific information including incoming call (page) signals, voice channel assignments, maintenance instructions, and handoff instructions as a mobile station travels out of the radio coverage of one cell and into the radio coverage of another cell. The reverse control channel usually carries call origination signals, page response signals and registration signals generated by the mobile stations which are listening to the forward control channel. Careful analysis of the context, timing or frequency of these mobile station activities as taught by the present invention can reveal the existence of fraudulent mobile stations. In particular, by monitoring the occurrences of multiple accesses, activity collisions and premature registrations, and by using auditing, operator-initiated locating and subscriber activity tracing, fraud instances can be detected and addressed.

Multiple Access

A "multiple access" occurs when a system access (e.g., originating access, page response or registration access) from a mobile station is detected over two or more control channels identified by the same channel number (CHN) and the same digital color code (DCC). Although, preferably, no two control channels operating on the same frequency (co-channels) should be identified by the same DCC, the DCC is only a few bits long, e.g., 2 bits, and there is a limited number of RF channels which can be used as control channels (in the United States, there are 21 dedicated control channels in each system). Hence, there is a limited number of control channels and possible values for the DCC and, because of frequency reuse, some likelihood that more than one control channel will have the same channel identifying data (CHN and DCC).

In order to avoid a false access by an interfering mobile station, current cellular systems screen all accesses before acceptance on the basis of the following criteria: All accesses of the same type (i.e., all registrations or all page responses or all originating accesses) received from a given subscriber within a short time (typically 100 ms) are considered to be caused by a multiple access. The access with the highest signal strength (SS) is considered to be the true access (the SS is measured at each base station upon receipt of the access). Improving the screening criteria in accordance with the present invention can lead to the detection of fraudulent mobile stations.

Figure 2:
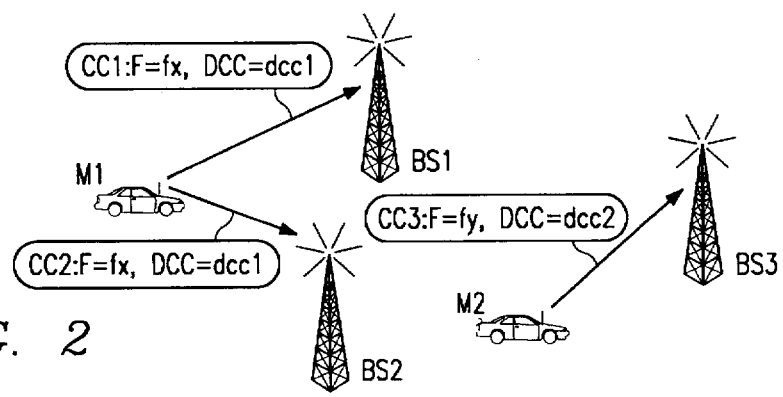
FIG. 2 is a pictorial illustration of multiple access in the network shown in FIG. 1.

According to the improved screening process, during the multiple access screening period, accesses from more than one mobile station having the same MIN/ESN identity (i.e., clones) are also treated as multiple accesses. Since a true multiple access involves control channels having the same identifying data (CHN and DCC), the So-called co-channel/ co-DCC criteria, improving the screening process to detect multiple accesses which do not meet the co-channel/co-DCC criteria will permit the detection of clones. FIGS. 2–3 illustrate the multiple access scenario and the treatment of multiple accesses by the present invention.

Referring now to FIG. 2, a mobile station M1 responds to a page by sending a page response via a first control channel CC1 used by a first base station BS1. This access is detected by a second base station BS2 using a second control channel CC2 which has the same frequency fx and digital color code dcc1 as CC1. In the meantime, a second mobile station M2 with the same identity as M1 also responds to the page by sending a page response via a third control channel CC3 used by a third base station BS3. CC3 uses a different frequency fy and digital color code dcc2 than those used by CC1 and CC2. In conventional systems, the multiple access screening process would treat all three accesses as multiple accesses. However, the improved screening method of the present invention distinguishes between true multiple accesses and accesses from a cloned mobile station. In the example shown in FIG. 2, the improved method will flag the access on CC3 as a security violation.

Figure 3A:
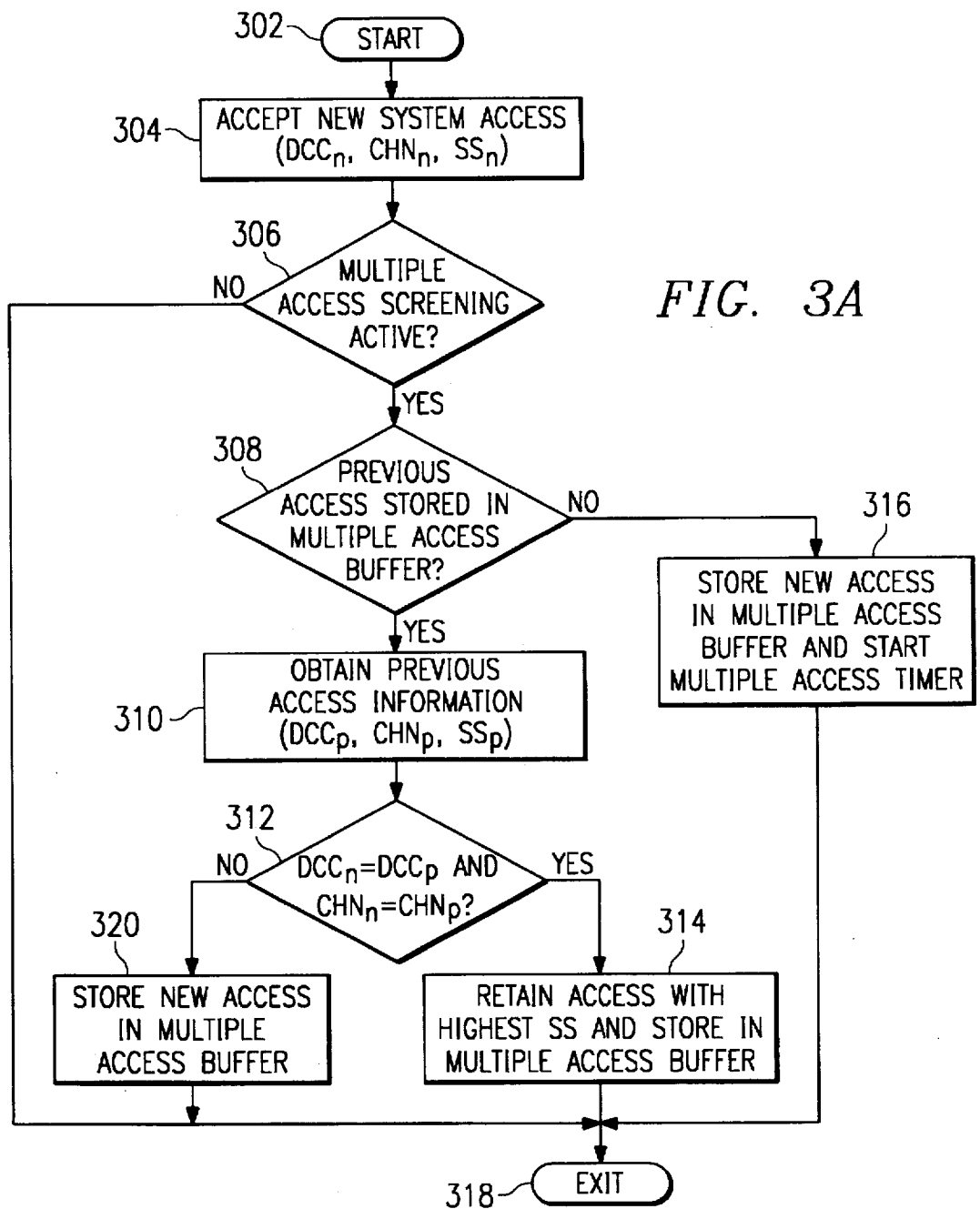
FIGS. 3A–B are flowchart illustrations of the multiple access fraud detection method of the present invention.
Figure 3B:
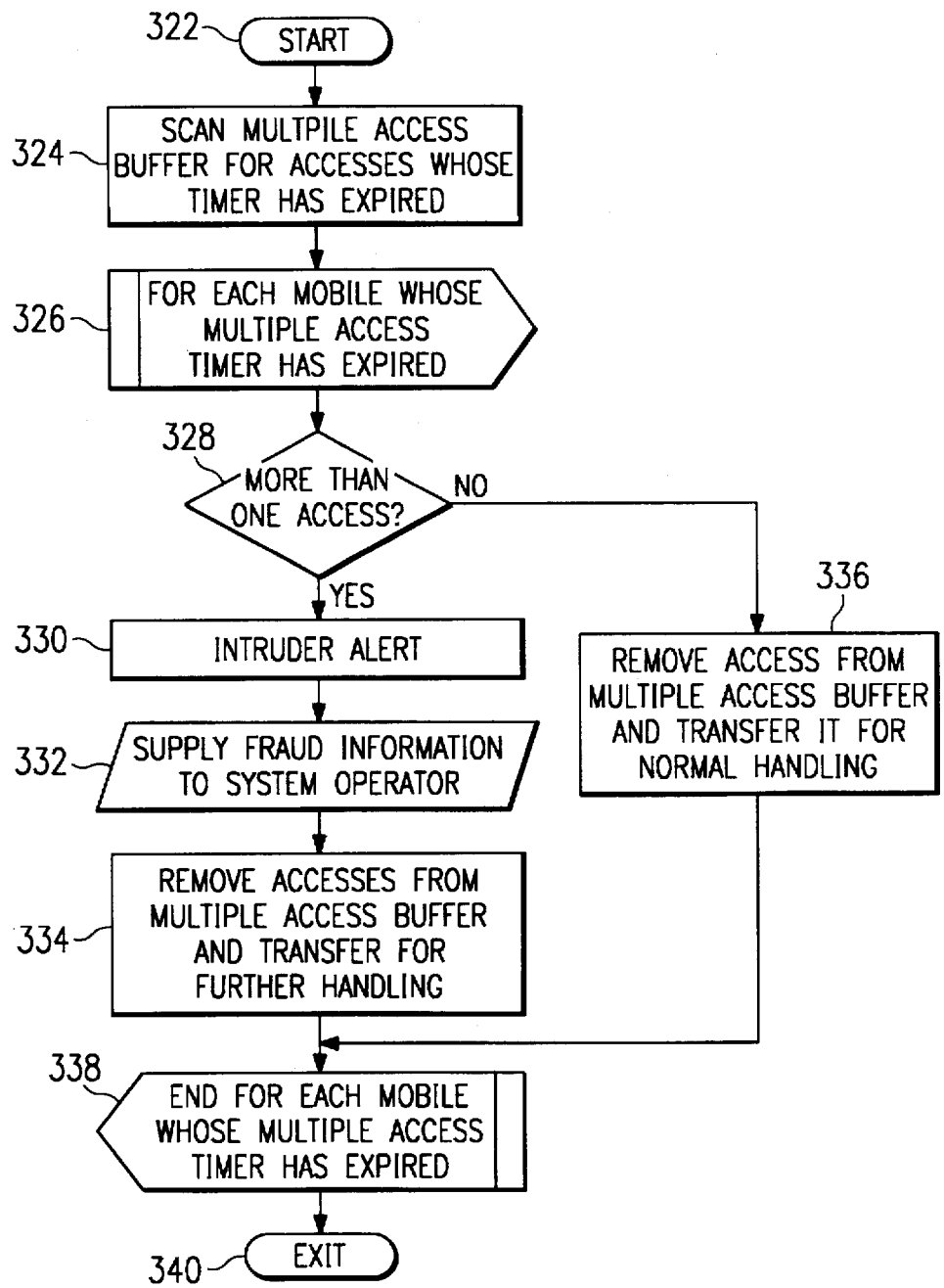

The improved multiple access screening process is illustrated in the flow charts of FIGS. 3A–B. Referring first to FIG. 3A, the system is assumed to be initially monitoring the system control channels for system access requests from mobile stations. At block 302, the multiple access detection process is invoked when the system receives a system access request from a mobile station on one of the system control channels. The system access request can be any type of access that is transmitted by a mobile station on a control channel. This includes a registration request, a call access request, a solicited or unsolicited page response or a service call. Each of these system access requests contains data necessary for the system to accept the request and is associated with a DCC, CHN and SS for the control channel on which the access request was received. For purposes of the improved multiple access screening method, the DCC, CHN and SS values will be considered part of the access request and will be stored and manipulated in a multiple access buffer along with the other access data.

At block 304, the system identifies the mobile station and accepts the new (nth) access request with its associated values of $DCC_n$, $CHN_n$ and $SS_n$. At block 306, the system determines whether the multiple access screening process has been activated by the system operator. If the multiple access screening has been deactivated, the system moves to step 318 and exits the process. If multiple access screening is activated, the system moves to step 308 where it determines whether a previous access from this particular mobile station (MIN/ESN) is stored in the multiple access buffer. If no such previous access request is stored in the multiple access buffer, the system moves to step 316 where it stores the new access request in the multiple access buffer and starts a multiple access timer for this mobile station. The system then moves to block 318 and exits the multiple access screening process.

The multiple access timer is started each time an initial access by a particular mobile station is stored in the multiple access buffer. The timer is set to run a predetermined length of time which defines how long the multiple access screening process will monitor the system control channels for subsequent accesses by the same mobile station after the initial access occurs. A value of 100 ms, as used in conventional multiple access screening methods, could be used to set the multiple access timer in the screening process of the present invention.

If, at block 308, a previous system access by the same mobile station is found to be stored in the multiple access buffer, the multiple access timer will have already been started by a previous access. In this case, the system moves to step 310 and retrieves the values of DCCp, CHNp and SSp for each previous (pth) access so that they may be compared with the corresponding values for the new (nth) access. At step 312, the system searches for a stored access which has the same DCC and CHN values as the new access. If a stored access is found to have the same DCC and CHN as the new access the system moves to step 314. At step 314, the system determines which of the two accesses with the same DCC and CHN has the highest SS and then retains that access in the multiple access buffer and discards the other access. If, at block 312, it is found that no stored previous access exists with the same DCC and CHN as the new access, the system moves to block 320 (this happens if either the DCC or CHN comparison fails). At block 320, the new access is stored in the multiple access buffer along with the previous accesses from the same mobile station with different DCC or CHN values. The system then moves to step 318 and exits the multiple access screening process.

The system will reinvoke the multiple access screening process when another system access is received or when a multiple access timer interrupt is generated. When another system access is received, the process of FIG. 3A will be repeated. When a multiple access timer interrupt is generated, the system will perform the steps shown in the flow chart of FIG. 3B. The multiple access timer interrupt is an interrupt signal which is generated periodically in the system. The period of this interrupt signal may be, for example, 30 ms.

Referring now to FIG. 3B, the process is invoked at block 322 when a multiple access timer interrupt is generated by the system. At block 324, the multiple access buffer is scanned for accesses by a mobile station whose multiple access timer has expired. The system then proceeds to block 326 and executes the same subroutine for each mobile station whose multiple access timer has expired. At block 328, the system determines whether more than one access from the mobile station is stored in the multiple access buffer. If only one access is stored in the multiple access buffer, the system moves to block 336. At block 336 the single access is removed from the multiple access buffer and transferred for normal handling by the system.

If, at block 328, more than one access from a mobile station is found to be stored in the multiple access buffer, the system first moves to 330 where an intruder alert is generated and then to 332 where relevant fraud information, e.g., MIN/ESN and location data, is supplied to the system operator. At block 334, the accesses are removed from the multiple access buffer and transferred for further handling which may include denying service to the identified mobile station or barring of the service subscription for that mobile station. At block 338, the subroutine loops to the beginning at block 326 and repeats for the next mobile station whose timer has expired. The system exits the subroutine at block 340 when the multiple access buffer has been cleared of all accesses by mobile stations whose multiple access timers have expired.

SCM Comparison

As described earlier, the SCM is transmitted along with the MIN/ESN at system access to enable the system to identify the operating parameters (i.e., transmit power, mode and frequency range) of the mobile station. Except in rare instances, the operating parameters for a particular mobile station should not change from one system access to the next. The power class of the mobile station, for example, should be the same in two consecutive accesses. Exceptions may occur where, for example, a transportable mobile station is configured as a vehicular mobile station or an RF power booster is connected to a portable to increase its output power. Similarly, the frequency range of the mobile station, which may have been initially set to the basic frequency band, may be reset to include the extended frequency band. Outside of such isolated instances, however, SCM information for a mobile station should not change between two consecutive accesses (e.g., the power class should not reflect a portable mobile station during one access and a vehicular mobile station in the next access from the same mobile station).

According to the present invention, the SCM information transmitted by a particular mobile station (associated with a particular MIN/ESN pair) during one system access is compared to the SCM information transmitted by this mobile station in another access. If the SCM information for the two accesses is different, fraud can be detected. In general, a mismatch in SCM information may occur either during multiple access screening or during normal call processing when the SCM information stored in the subscriber record from the previous access varies from the SCM information contained in the access which was just received by the system. In either case, the variance in SCM information may signal the existence of a fraudulent mobile station.

Activity Collision

An activity collision occurs when the system determines that a mobile station has made multiple service requests simultaneously. The requests may have been received by a single MSC or by several different MSCs in a network. Within an MSC, activity collisions arise when a service request (e.g., an originating call, a registration, a page response, or a visitor record cancellation order) is received from or for a mobile station while the mobile station is "busy" marked as already receiving service. For example, the reception of a registration attempt while the mobile is considered by the system to be in "conversation" constitutes an activity collision. On a network level, an activity collision may arise when the home system or HLR considers a mobile to be active in a call in the service area of one MSC and yet receives an indication of the presence of the mobile station in the service area of another MSC, e.g., the HLR receives a registration notification or remote feature control message from the other MSC. In conventional systems, colliding registrations are always accepted. For all other types of collisions, the system forces the colliding access to be terminated.

Unlike conventional systems, the present invention recognizes that activity collisions may indicate the existence of multiple mobile stations using the same identity. However, the present invention also recognizes that the occurrence of a collision does not always imply fraud. Some of the collisions could be caused by other factors. For example, an activity collision may occur if a mobile station makes an access immediately after terminating a call, but the system has failed to detect the call release properly and, therefore, still considers the mobile station to be actively receiving service. Another example occurs where a voice channel being used for one call captures another call in progress over a co-channel. Faced with the co-channel interference, the user may decide to terminate and retry the call. Because of the existence of co-channel interference, however, the system may consider the interfered-with call to be still in progress and the access attempt will collide with the busy marking.

To overcome false indications of collision, whenever an access collides with a busy marking in an MSC, the system should first verify that the previously marked mobile station is still connected to the voice channel. The voice channel connection can be verified, for example, by sending an audit order to the mobile station over the forward voice channel. Fraud can be assumed if the mobile station returns an audit confirmation on the reverse voice channel. Furthermore, a collision in the HLR should trigger the cancellation of the visitor record in the previous serving MSC. In the cancelling MSC, the cancellation order should automatically activate the voice channel connection verification process if the mobile station is still considered to be engaged in a call. The result of the verification attempt should then be returned to the HLR. Based on the verification result, the HLR may flag the collided access as a security violation.

Figure 4:
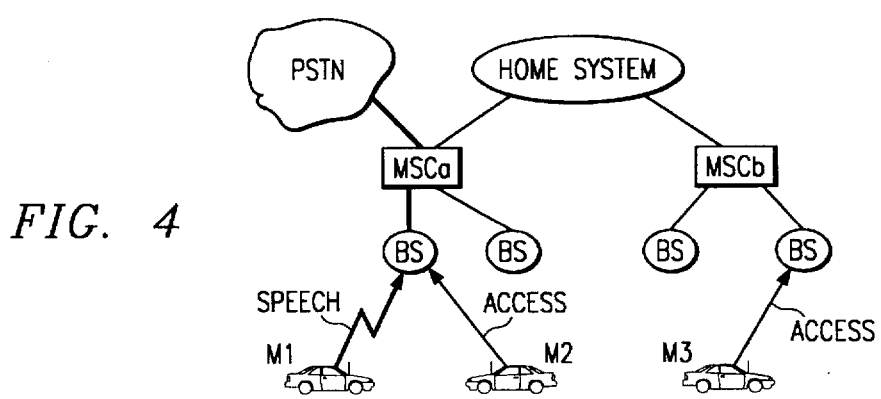
FIG. 4 is a pictorial illustration of activity collision in the network shown in FIG. 1.

An exemplary collision detection scenario is depicted in FIG. 4 which shows a network including two exchanges MSCa and MSCb. Within the service area of MSCa, a first mobile station M1 is engaged in a voice conversation through the nearest base station BS. Meanwhile, an access attempt is received from a second mobile station M2 which has the same (MIN/ESN) identity as M1. The system retrieves the corresponding subscriber record and finds M1 already busy. At this point, MSCa issues an audit order over the voice channel to which M1 is connected. If M1 confirms the order, the second access must have come from a different mobile station (M2) with the same identity since it is not possible for a mobile station to be in conversation over the voice channel and, at the same time, make an access via the control channel.

Figure 5:
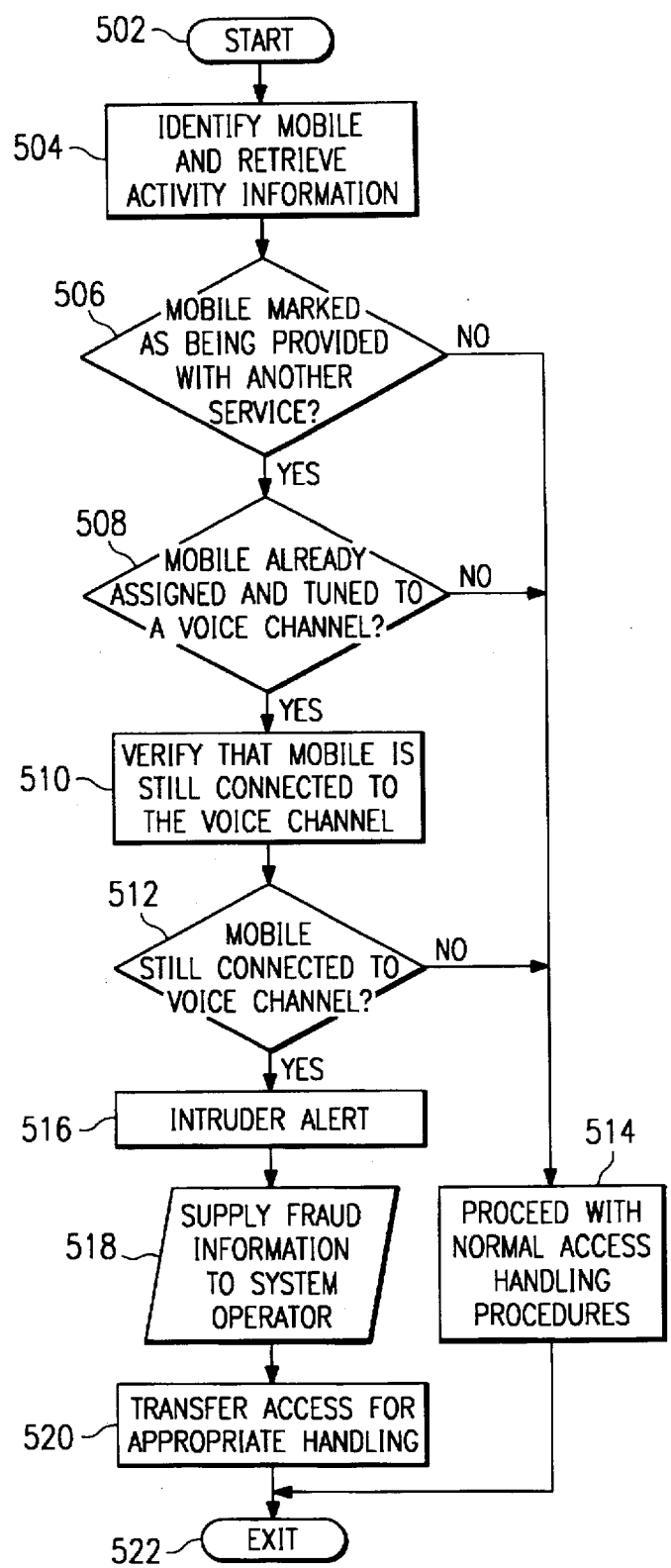
FIGS. 5–6 are flowchart illustrations of the activity collision fraud detection method of the present invention.

FIG. 5 shows a flowchart of the activity collision fraud detection process which may be executed in an MSC operating according to the present invention. At block 502, the activity collision detection process is invoked upon receipt by the MSC of a system access request from a mobile station. At step 504, the MSC identifies the mobile station which is making the access request and retrieves the activity information for that mobile. The MSC then moves to step 506 where the activity information is examined to determine if the mobile is already being provided with another service. If the mobile is not being provided with another service, the MSC moves to step 514 and proceeds with the normal call handling procedures and, at step 522, the MSC exits the collision detection process.

However, if at step 506, it is determined that the mobile is being provided with another service, the MSC moves to 508 and determines whether or not the mobile has already been assigned and has tuned to a voice channel. If the mobile has not been assigned or has not tuned to a voice channel, the MSC moves to step 514 and proceeds with the normal call handling procedures and, at step 522, the MSC exits the collision detection process. If, on the other hand, it is determined that the mobile has been assigned and has tuned to a voice channel, the MSC moves to step 510 and performs an audit to verify that the mobile is still connected to the voice channel.

At step 512, the MSC evaluates the results of the audit. If the audit reveals that the mobile is not connected to the voice channel, the MSC moves to step 514 and proceeds with normal call handling procedures and, at step 522, the MSC exits the collision detection process. However, if the audit reveals that the mobile is still connected to the voice channel, the MSC moves to step 516 where an intruder alert is generated. The MSC then proceeds to step 518 and supplies information on the suspected fraudulent activities to the system operator. At step 520, the received access is transferred for appropriate handling which may include denial of service to the mobile or barring future use of the subscription. The MSC then exits the collision detection process at step 522.

Referring again to FIG. 4, an activity collision may also be detected on a network level. In FIG. 4, MSCb receives an originating call from a third mobile station M3 which holds the identity of M1. MSCb fetches the corresponding subscriber profile from the home system or HLR, assigns a voice channel to M3 and informs the HLR that the mobile is active in MSCb. However, as a result of M1's earlier activities in MSCa, the HLR recorded MSCa as M1's current location. The new activity reporting from MSCb will then result in the setting of the mobile station's temporary location (TLOC) in the HLR. Setting the TLOC implies that the mobile station is currently receiving service (i.e., engaged in a call) in an exchange where it has not registered before. Since activity corresponding to the same mobile identity is reported from a new MSC, the HLR orders MSCa to cancel the subscriber record for M1. If, upon receipt of the cancellation order, MSCa determines that M1 is indicated to be active in its coverage area, MSCa will initiate a voice channel connection verification process through the audit procedure. If M1 is still receiving service in MSCa, M1 will respond with an audit confirmation. MSCa may then postpone action on the cancellation order and return the result of the voice channel connection verification to the HLR. The HLR can then flag this activity collision as a fraud incident since it is not possible for one mobile station to actively receive service in more than one location.

Figure 6:
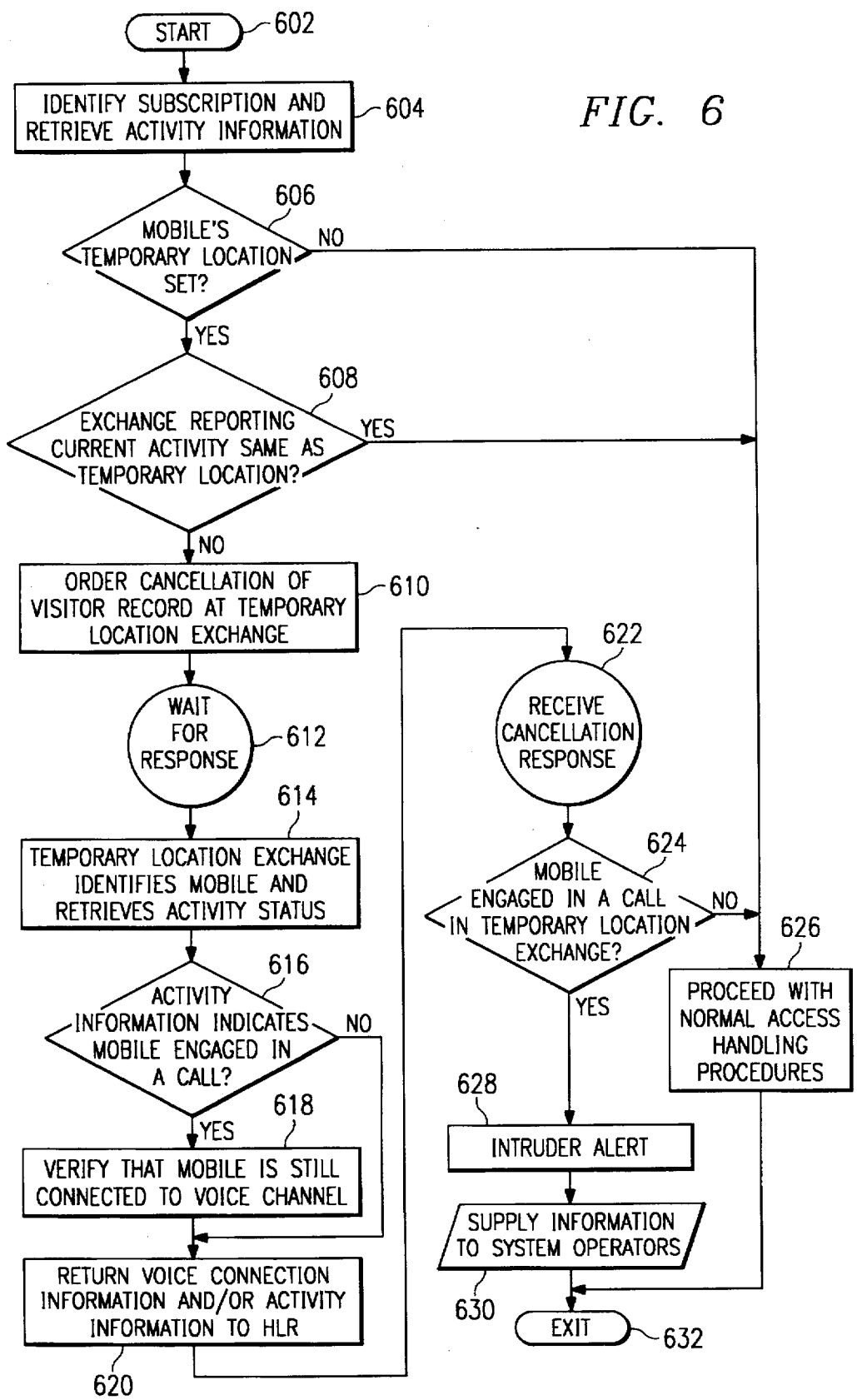

FIG. 6 shows a flowchart of the activity collision fraud detection process which may be executed in a cellular network operating according to the present invention. This activity collision fraud detection process is invoked at step 602 upon receipt by the home system (home MSC and/or HLR) of a notification that a system access has been made somewhere in the network by one of its own (home) subscribers. This access may be any type of access which is transmitted on a control channel (e.g., a registration request, a call access request, a solicited or unsolicited page response, or a service call). At step 604, the subscription for the mobile making access is identified and activity information on this mobile is retrieved. At step 606, the home system determines whether or not a temporary location (TLOC) has been set for this mobile station. If the temporary location is not set, the mobile is not engaged in another call and the home system moves to step 626 where the call is handled in the normal manner. The home system exits the collision detection process at step 632.

If, at step 606, it is determined that a temporary location for the mobile has been set, the home system moves to step 608 and determines whether the exchange reporting the current activity is the same as the one indicated by the temporary location value. If so, the home system moves to step 626 and the call is handled in the normal manner. However, if the exchange reporting the current activity and the exchange indicated by the temporary location are found to be different, the home system moves to step 610 and orders the cancellation of the mobile's visitor record at the temporary location exchange. At step 612, the home system waits for a response while the temporary location MSC processes the cancellation order.

At step 614, the temporary location MSC receives the cancellation order, identifies the mobile and retrieves the activity status of the mobile in that MSC. At step 616, the temporary location MSC determines whether or not the activity status indicates that the mobile is engaged in a call. If the activity status indicates that the mobile is engaged in a call, the temporary location MSC moves to step 618 and audits the mobile station in order to verify the voice channel connection. At step 620, the temporary location MSC sends the voice channel connection information and activity status in a cancellation order response to the home system. However, if at step 616, the activity status indicates that the mobile is not engaged in a call, the temporary location MSC jumps to step 620 and returns only the activity status in the cancellation order response back to the home system.

At step 622, the home system receives the cancellation order response from the temporary location MSC and continues to step 624 where the cancellation order response is evaluated to determine whether the mobile is still engaged in a call in the temporary location exchange. If the response indicates that the mobile is not engaged in a call, the home system moves to step 626 and the call is handled in the normal manner. At step 632, the network exits the activity collision detection process. If, at step 624, the cancellation response indicates that the mobile is engaged in a call, the home system generates an intruder alert at step 628 and then supplies information on the suspected fraudulent activity to the affected system operators at step 630. At step 632, the network exits the activity collision detection process.

Premature Registration

A mobile registration mechanism is used in cellular systems for two primary purposes. First, registration allows a system to keep track of the location of mobile stations to enable the routing of incoming calls to them. Second, registration allows the system to determine whether or not a mobile station is active (powered and within radio range) in the system. Incoming calls to inactive mobile stations can be routed to a recorded message (e.g., "the mobile subscriber you have called has turned off his unit or travelled out of the service area") thus avoiding the need to page these mobile stations only to find out they are inactive (i.e., no page response). Eliminating this unnecessary paging results in more efficient use of the limited control channel capacity.

A mobile station can register either autonomously or non-autonomously. Autonomous registration occurs automatically without user intervention. Non-autonomous registration, on the other hand, is initiated by the user. Current cellular systems support three types of autonomous registration, namely, system area, location area and periodic registration. The system area and location area registration functions cause a mobile station to register when it enters a new system area or a new location area, respectively (an exception to system area registration is the "multisystem memory" mobile station which stores the system identifications for a number of systems in which it most recently registered and, therefore, can move across these systems without registering). The periodic registration function causes the mobile station to register at predetermined time intervals defined by the system operator.

Figure 7:
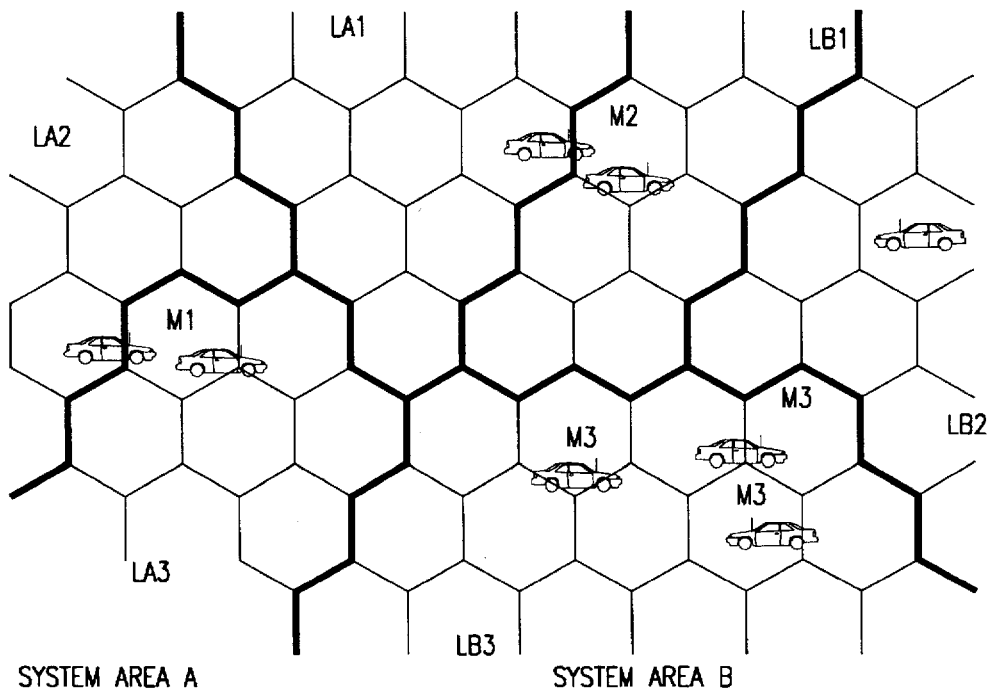
FIGS. 7–8 are pictorial illustrations of mobile station registration in the network shown in FIG. 1.

Referring next to FIG. 7, a pictorial illustration of the different types of registration functions may now be seen. In FIG. 7, two adjacent cellular system areas A and B include location areas LA1–LA3 and LB1–LB3, respectively, in which mobile stations M1–M3 can travel. In the example shown in FIG. 7, M1 registers upon crossing the border between LA2 and LA3 (location area registration). M2 registers upon crossing the border between LA1, which is in system area A, and LB1 which is in system area B (system area registration). M3 is moving around in LB3 and registers periodically within this location area (periodic registration).

Figure 8:
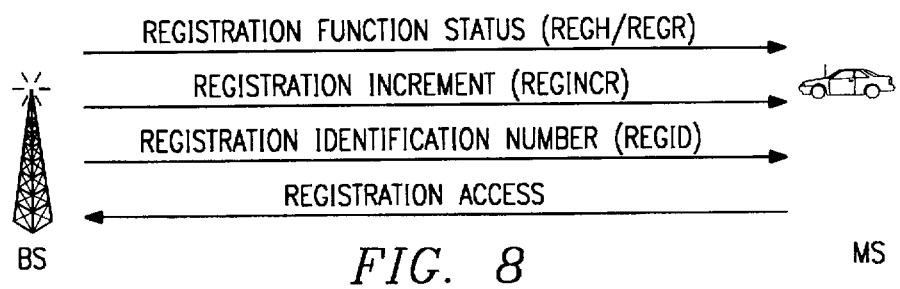

When the periodic registration function is activated within a location area in the system, mobiles capable of autonomous registration should register at predefined regular intervals while present in that location area. The parameters that regulate the periodic registration function include the registration function status bit (REGH or REGR), the registration identification number (REGID), and the registration increment (REGINCR). The status bit REGH or REGR denotes whether or not periodic registration is activated for the home subscribers or roaming subscribers, respectively. The REGINCR defines the length of the periodic registration interval (how often to register). The REGID is a 20 bit counter that is stepped by one unit in every REGID message transmitted to the mobile station (this counter is analogous to a system clock which reflects current time). These parameters are transmitted in the overhead message train (OMT) on the forward control channel from the base station (BS) to the mobile station (MS) as generally shown in FIG. 8.

The mobile station stores the last received REGID value in temporary memory, and stores in semi-permanent memory the last received REGINCR value and a next registration (NXTREG) value which is calculated by the mobile station by adding REGID to REGINCR (the REGINCR and NXTREG values are retained by the mobile station for a certain time period, e.g., 48 hours according to EIA-553, even after the power has been turned off). At initialization, the mobile station assigns a default value of 450 to REGINCR and the value zero to NXTREG. The system broadcasts REGID and REGINCR at regular intervals. Upon receipt of the first REGID/REGINCR message after initialization, the mobile stores these values in the appropriate memory.

Each reception of a REGID message by the mobile station triggers the periodic registration determination (whether or not to register). Upon receipt of a REGID message, the mobile station checks whether the REGID value has cycled through zero. If so, the NXTREG is set to MAX[0, NXTREG-2**20]. The mobile station then compares the last received REGID value with the stored value for NXTREG. If REGID is greater than or equal to the stored NXTREG, the mobile station makes a registration access as generally shown in FIG. 8. If the system confirms the registration, the mobile station updates NXTREG with the value of the last received REGID plus REGINCR. If the registration access attempt fails, the mobile will attempt to re-register after a random delay by setting the NXTREG value to the value of REGID plus a random number (NRANDOM). At call origination or reception, the mobile station updates NXTREG, in the manner described above, after every successful voice channel designation (since by making or receiving a call, a mobile shows activity, call originations and receptions are treated like normal registrations).

The present invention uses the periodic registration facilities to detect fraud. More specifically, fraud could be suspected when a periodic registration access arrives from a mobile station prematurely, i.e., before the scheduled next registration time. To detect premature registrations in a location area where periodic registration is active, the system can retain, for each mobile subscriber, the last registration type (periodic, forced, etc.), the last registration access time (REGID value at the time of last registration) and the location area identification (LOCAID) for the location area where the last registration originated. The arrival of a new registration from within the same location area will trigger a comparison of the arrival time to the expected next registration time (or, alternatively, a comparison of the elapsed time since the last registration with the registration period REGINCR). The arrival time may be the time of the registration or, in the case of incoming or outgoing calls, the time of voice channel designation. The expected next registration time can be estimated as the sum of REGINCR and REGID at the time of last registration. A premature registration is declared when a new registration access arrives before the expected next registration time (or, alternatively, when the interval of time between the previous registration and the current registration is less than the registration period).

Figure 9A:
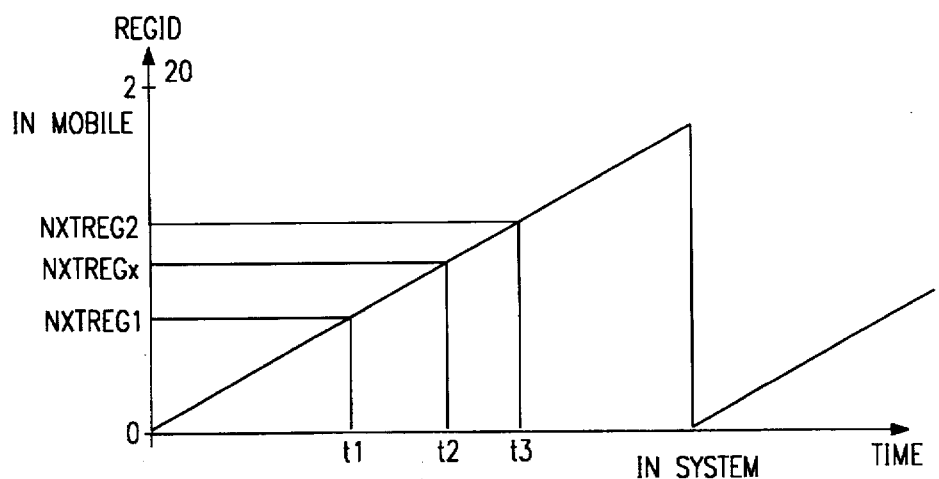
FIGS. 9A–B are pictorial illustrations of premature registrations in the network shown in FIG. 1.

FIG. 9A is a graphical depiction of a premature registration. In FIG. 9A, the vertical axis represents the value of the last REGID received by a particular mobile station while the horizontal axis represents the passage of time in the system. For simplicity, all of the mobile registrations referenced in FIG. 9A are assumed to come from a single location area in the system. The last registration access from this mobile station was at time t1 when REGID was equal to NXTREG1. At t1, the mobile calculated and retained in memory the next registration time NXTREG2 (=REGID at t1+REGINCR)=t3. Likewise, the system expects the next registration from this mobile station at time t3. At time t2, however, the system receives a registration access from the same mobile station. Since t2 is earlier than t3, the mobile that made the early access must have estimated a next registration time (NXTREGx) which is different from NXTREG2. The new registration at t2, therefore, is a premature registration, which raises the possibility that the new registration was made by a second (cloned) mobile station with the same identity as the first mobile station which had registered at t1.

Figure 9B:
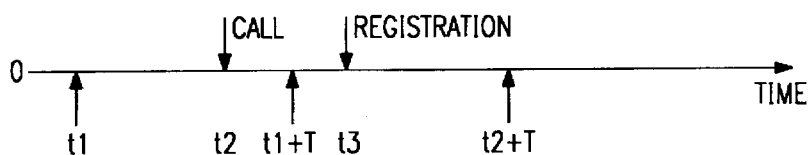

FIG. 9B depicts a premature registration scenario in which a call intervenes between periodic registrations. The time line of FIG. 9B is analogous to that of FIG. 9A. In FIG. 9B, a mobile station registers at time t1 and its next registration is expected at (t1+T), where T=REGINCR. A call intervenes at time t2 before (t1+T) and the system re-calculates the next registration time to be (t2+T). A registration then arrives at t3. Since the system did not expect a registration before (t2+T), the new registration is flagged as premature.

Figure 10:
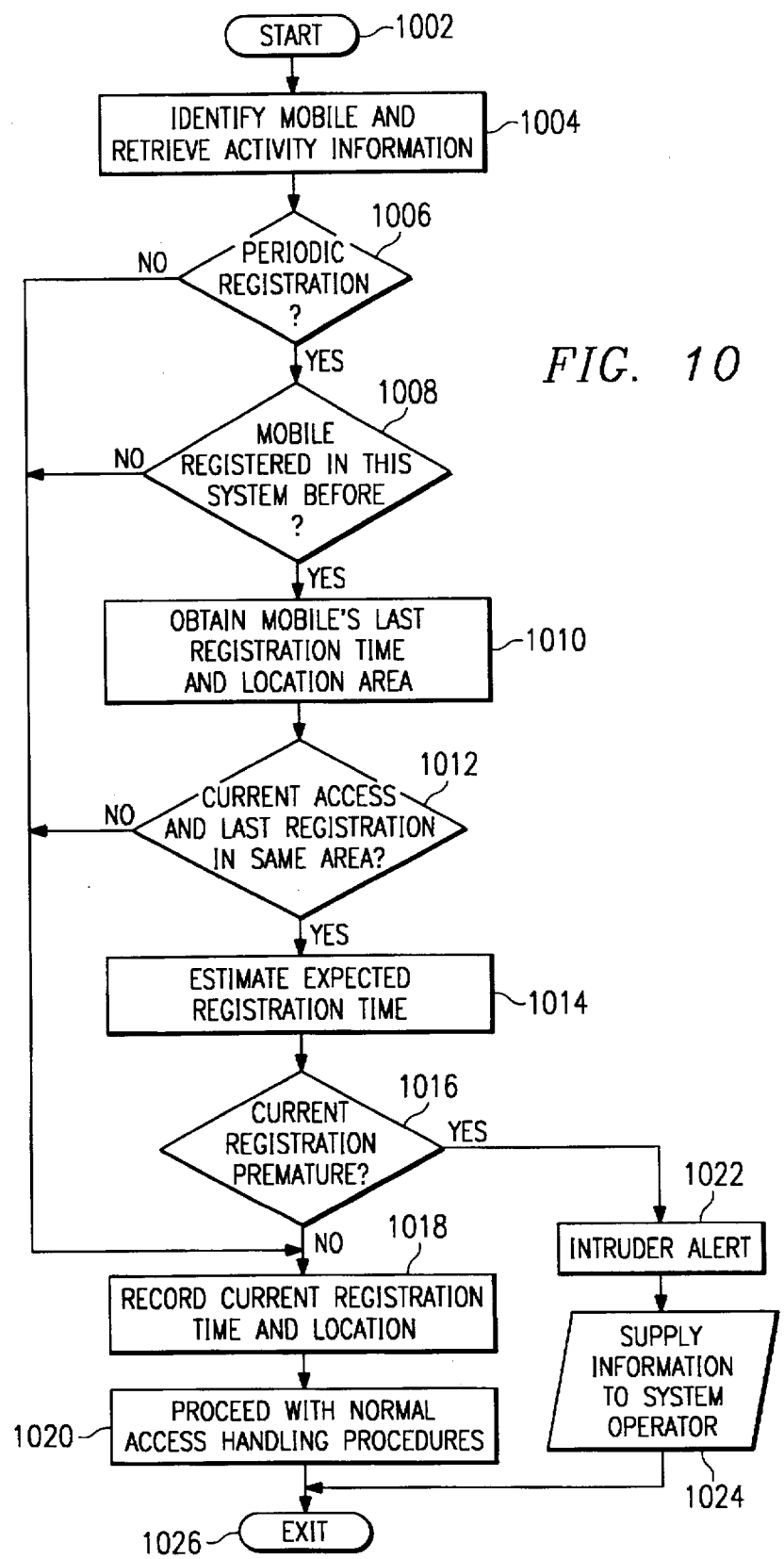
FIG. 10 is a flowchart illustration of the premature registration fraud detection method of the present invention.

The premature registration fraud detection process of the present invention is shown in the flowchart of FIG. 10. At block 1002, the premature registration fraud detection process is invoked upon receipt by the system of a registration access request. At step 1004, the system identifies the mobile station making the registration access request and retrieves activity information for that mobile in this system. At step 1006, the system determines whether or not the received registration access request is a periodic registration. If the access request is not a periodic registration, the system jumps to step 1018 and records the time (REGID) and location area identification (LOCAID) for the access request. The system then moves to step 1020 and handles the access in the normal manner. At step 1026, the system exits the premature registration fraud detection process.

If, at step 1006, the registration access request is found to be a periodic registration, the system moves to step 1008 and examines the activity information to determine whether the mobile has registered in this system before. If the mobile has not previously registered in this system, the system goes to step 1018 and records the REGID and LOCAID for the registration access request. The system then moves to step 1020, handles the access in the normal manner, and exits the process at step 1026.

If it is found, at step 1008, that the mobile has previously registered in this system, the system proceeds to step 1010 and obtains from the mobile's activity information the REGID and LOCAID at the time of last registration. At step 1012, the LOCAID values for the current and the last registration accesses are compared. If the LOCAID values are different, the system moves to step 1018 and records the REGID and LOCAID for the current registration access. The system then moves to step 1020, handles the access in the normal manner, and exits the process at step 1026.

If, at step 1012, it is found that the LOCAID values for the current and last registration access requests are equal, the system goes to step 1014 where an expected next registration time is calculated as the sum of REGINCR and REGID at the time of last registration. The system then moves to step 1016 and determines whether the current registration access is premature, i.e., whether the time of the current registration access is earlier than the expected next registration time. If the current registration access is not premature, the system goes to step 1018 and records the REGID and LOCAID for the current registration access. The system then moves to step 1020, handles the call in the normal manner, and exits the process at step 1026.

If, at step 1016, the current registration access is found to be premature, the system goes to step 1022 and issues an intruder alert. This is followed by step 1024 where the system supplies information on the suspected fraudulent activities to the system operator. At step 1026, the system exits the premature registration process and returns to monitoring the control channels for further registration access requests by mobiles.

It should be noted that there are a limited number of situations in which the premature registration fraud detection process of the present invention may indicate fraud when the premature registration is, in fact, the result of other factors. For example, a mobile station may prematurely register if, at power up before the next registration time, it finds the stored registration data corrupted and, therefore, makes a registration access. Another example is where the mobile station enters a new location area and attempts to register, but the registration attempt fails. When it attempts to re-register, the mobile station rescans the control channels and tunes to the control channel in the old location area, and then sends a registration message on this control channel before the next registration time calculated while it was in the old location area. These anomalous premature registrations, however, are likely to be relatively rare in practice and should not affect the overall utility of the premature registration fraud detection process of the present invention.

Auditing

Figure 11:
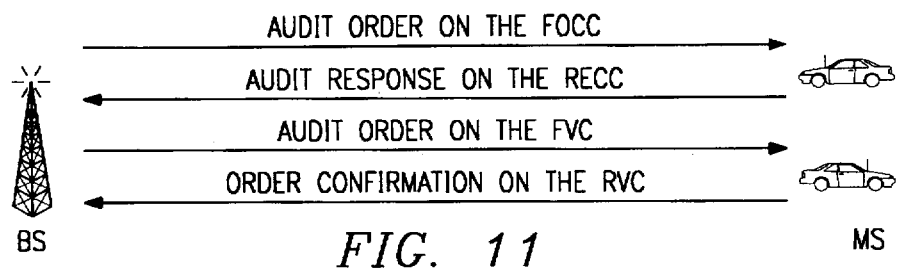
FIG. 11 is a pictorial illustration of mobile station auditing over a control or voice channel.

Through the audit function and over the air interface, a cellular system can request a mobile station to disclose its position without the knowledge of the user. The audit procedure may be performed over a control channel or a voice channel (analog or digital) as shown in FIG. 11. A base station (BS) sends to a mobile station (MS) an audit order on the forward control channel (FOCC) or the forward voice channel (FVC), and the MS responds to the audit order received on the FOCC or FVC by sending to the BS an audit response on the reverse control channel (RECC) or an order confirmation on the reverse voice channel (RVC), respectively.

The audit function can be used to detect the existence of multiple mobile stations with the same identity. For example, whenever a mobile station makes an access from a new location, an audit order can be issued to verify the existence of the mobile station in the previous location. If the mobile responds from the previous location, fraud is suspected.

There are numerous situations in which auditing can be used to detect fraud. Some of these situations will require auditing on the control channel while others will require auditing on the voice channel. For example, and as discussed earlier, an activity collision with a mobile station engaged in a call will require auditing of this mobile station on the voice channel. Auditing on the control channel, on the other hand, may unduly burden the limited control channel capacity. Thus, it is preferable to use control channel auditing only in more suspicious situations including the following (in each of these situations, the receipt of one or more audit responses will indicate fraud):

(a) Whenever a mobile station makes an access from a location known to be a fraud region (frequent reported incidents of fraud), the presence of the mobile station in the previous location is audited.

(b) Whenever a mobile station originates a call from an exchange where it has not previously registered, the presence of the mobile station in the exchange where it last registered is audited.

(c) Whenever two consecutive registrations are made from two separate locations within a time period which is less than the minimum time required to travel between these two locations, the presence of the mobile station is audited in the locations where the registrations were accepted.

Figure 12:
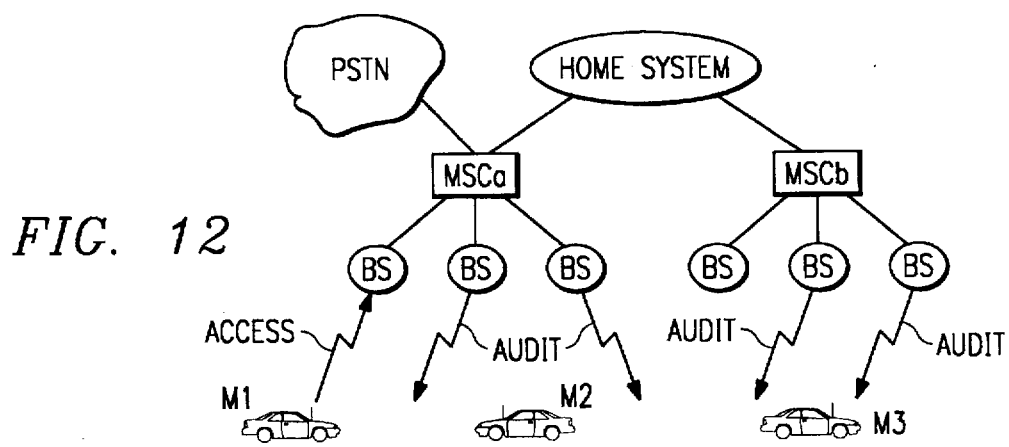
FIG. 12 is a pictorial illustration of the use of auditing to locate fraud in accordance with the present invention.

Referring next to FIG. 12, the use of the audit procedure to detect fraud at the exchange level and the network level may be seen illustrated therein. In FIG. 12, a first mobile station M1 originates a call access in the service area of MSCa. In the first example (exchange level), M1 is assumed to be currently registered with MSCa and the access is assumed to have come from a known fraud region. Suspicious of activities from a fraud region, MSCa audits M1 in its previous registered location. Assuming that a response is received from a second mobile station M2 with the same identity as M1, fraud is discovered within the exchange.

In the second example (network level), M1 is assumed to be currently registered with MSCb. As a result of the call access activity of M1 in MSCa, the home system orders MSCb to cancel the subscriber record for M1. Upon receipt of the cancellation order, MSCb audits M1 it its last known (registered) location if the mobile station is still considered active. Assume now that MSCb receives an audit response from a third mobile station M3 which has the same identity as M1. This audit result is then transferred to the home system which declares fraud.

Operator-Initiated Locating

When fraud is detected through, for example, any of the fraud detection mechanisms provided by the present invention, it may be useful to verify the existence and identify the location of target mobile stations prior to taking any remedial action. In conventional cellular systems, the determination of the exact position of a mobile station is initiated automatically when a terminating call is setup. The present invention provides an operator-initiated facility for determining the position of a mobile station by command. This facility will enable a system operator to search for and verify the existence of the target mobile station in a particular location before instituting any fraud countermeasures. The operator will have the option of specifying a search location, e.g., MSC service area(s), location area(s), or individual cell(s). When the search location is not specified, the last known location which is retained by the system can be used as the default search location.

The search (locating) command may be issued by the operator of either the serving exchange or the home system. The issuance of a locating command in the home system will trigger the sending of a search request to the specified MSC(s). The MSC receiving the locating command will send an audit order. If the target mobile station is found to be actively receiving voice service, the audit order will be sent on the voice channel to confirm that the mobile is still connected. Otherwise, the audit order will be broadcast via the control channel. From the response to the audit order, the system will be able to determine the activity status and geographical position (cell identity or coordinates) of the target mobile station. In case of multiple responses, information concerning all of the discovered locations are collected. This information will be returned to the home system (if the locating command was issued by the home system) and reported to the operator.

An example of the locating procedure of the present invention may be described with general reference to FIG. 12. In this example, the home system alerts the operator of an activity collision involving the mobile station M1 and exchanges MSCa and MSCb. Assume that the mobile's current activity is in the service area of MSCa and its last activity was in the service area of MSCb. The operator issues a locating command from the home system to MSCa and MSCb. When the search request is received, MSCa finds the subscriber idle and sends the audit order over the control channel. Assume now that an audit response is received by MSCa from the mobile station. MSCa then returns location-related information to the home system.

Meanwhile, since there is no subscriber record for mobile station M1 in MSCb (the record having been cancelled following the mobile's activity in the service area of MSCa), MSCb issues an audit order over the control channel in each of the cells in its service area. Assume now that multiple audit responses are received by MSCb from multiple locations. MSCb then transfers the location-related information to the home system. The home system makes all the location related information received form MSCa and MSCb available to the operator. At this point, the operator not only has validated the suspicion of fraud, but has found multiple clones and has obtained specific information concerning the location of each of the perpetrators.

Figure 13:
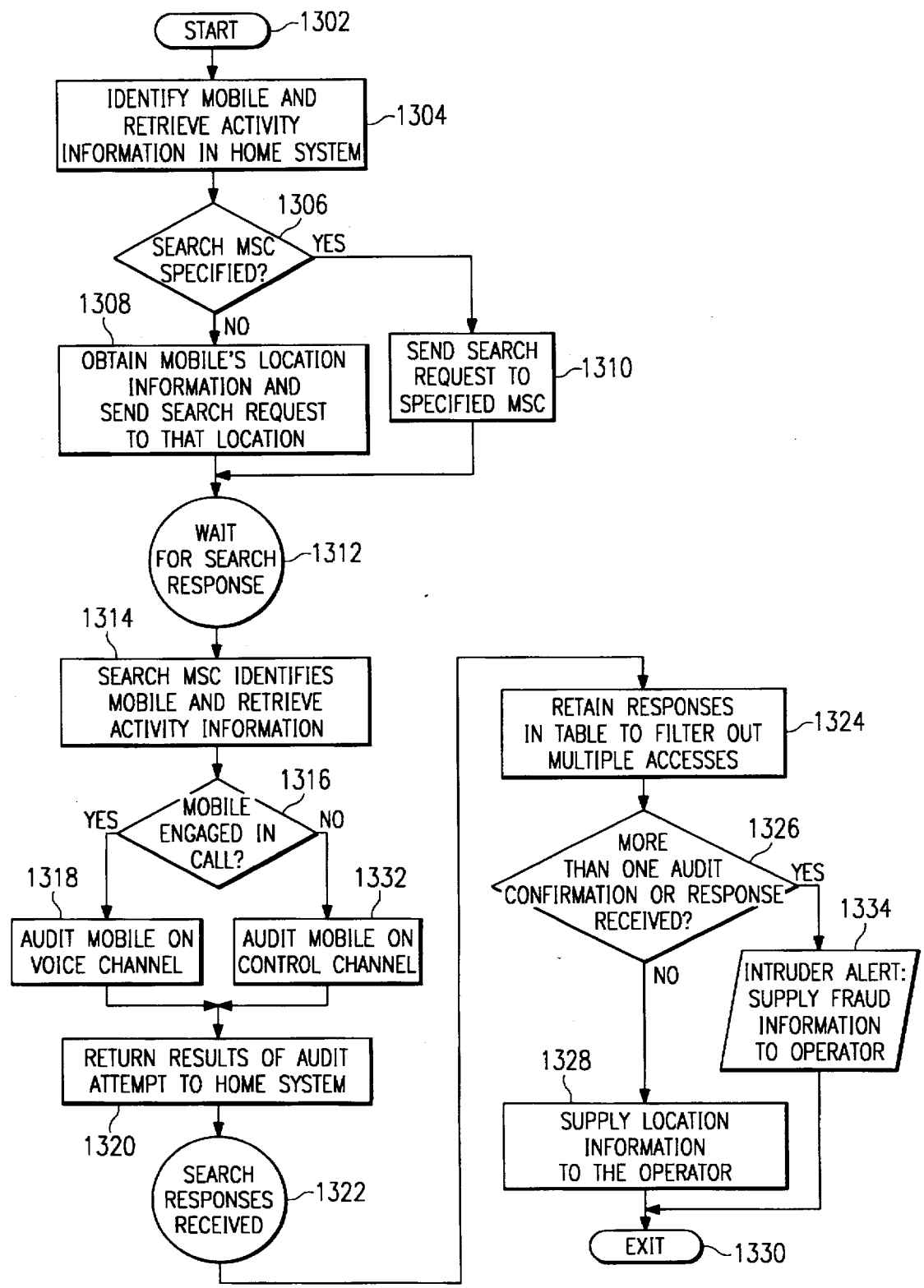
FIG. 13 is a flowchart illustration of operator-initiated locating of fraudulent mobile stations in accordance with the present invention.

Referring next to FIG. 13, there is illustrated a flowchart of steps which are executed by the home system (home MSC or HLR) and at least one exchange (MSC) taking part in an operator-initiated locating process in accordance with the present invention. At block 1302, the operator-initiated locating process is invoked when an operator issues a command in the home system to locate the position of a particular mobile station. At step 1304, the home system identifies the mobile station and retrieves activity information for this mobile station. At step 1306, the home system determines whether or not the operator has specified the exchange where the mobile is to be searched for. If the operator has not specified the exchange, the home system proceeds to step 1308 where it retrieves the latest location area information (LOCAID) for this mobile from the mobile's activity information and then issues a search request to the MSC which controls that location area. If it is found that the operator has specified an exchange for the search, the home system moves to step 1310 and issues a search request to the MSC specified by the operator. At step 1312, the home system waits for a response from the exchange to which the search request was sent.

At step 1314, the MSC which receives the search request identifies the mobile station and retrieves activity information on that mobile. This MSC then proceeds to step 1316 and determines from the activity information whether or not the mobile is engaged in a call. If the mobile is engaged in a call, the MSC proceeds to step 1318 and audits the mobile on the voice channel assigned for the call. If the mobile is not engaged in a call, the MSC proceeds to step 1332 and audits the mobile on the control channel. A response to the audit on the control channel may be received over the control channel of the MSC which sent the audit order or, if the mobile station has rescanned and tuned to a control channel of a neighboring MSC, over the control channel of the neighboring MSC. The response in the former instance is referred to below as a "solicited" response, while a response in the latter instance is referred to below as an "unsolicited" response.

At step 1320, the MSC which received the order confirmation, or the solicited or unsolicited audit response, returns the results of the audit to the home system. The returned information includes, for each response or confirmation, the mobile's activity status and geographical position. At step 1322, the home system receives the results of the audit and continues to step 1324 where the audit responses are placed in a table for a predetermined time period (e.g., 100 ms) sufficient to filter out multiple accesses. At the expiration of this time period, the home system moves to step 1326 and determines if more than one audit confirmation or response was received. If only one audit confirmation or response was received, the home system moves to step 1328 and supplies information on the location of the mobile station to the system operator. If more than one audit confirmation or response was received, the home system goes to step 1334 where it generates an intruder alert and also supplies information concerning the suspected fraud to the operator. The locating process is exited at block 1330.

Subscriber Activity Tracing

Mobile stations having the same (MIN/ESN) identity may not always be active simultaneously. Instead, their activities may be randomly spread over different times or locations within the serving area(s) of an exchange or several exchanges. According to the present invention, fraud may be detected by "tracing" the activities of any given mobile station over a period of time. During this period, data is collected on one or more aspects of the mobile station activities (e.g., activity type, activity time, activity location, activity frequency, etc.) that could lead to the discovery of fraud. By post-processing means, the collected data can be analyzed for the purpose of determining or substantiating the existence of fraud. For example, activity time and location data can be used to determine whether the amount of time between mobile station activities from two different locations is significantly smaller than the amount of time normally required to travel (e.g., at highway speed) between these two locations. Fraud can be detected if the analysis indicates that the distance between the two locations is greater than the maximum distance which could have been traversed by the mobile station given the amount of time between activities.

The system operator can select both the types of activity (e.g., registrations, originating calls, terminating calls, etc.) and the particular subscribers to be traced. Subscribers may be selected for tracing either on an individual subscriber basis wherein the selected subscribers are traced in any network or system location to which they may travel and receive service, or on a specific geographic region basis wherein the selected subscribers are traced only when receiving service in a particular region (location area or cell). The network-wide or system-wide tracing is useful in detecting or substantiating abuse of a particular subscription, while the location area-based or cell-based tracing allows the operator to keep a close watch on regions that are suspected to have a higher-than-normal incidence of fraud.

For the purpose of tracing on an individual basis, subscribers may be marked with a subscriber tracing class by adding a mobile activity tracing (MAT) parameter to the service profiles in the subscriber database of their home system (home MSC or HLR). The MAT parameter becomes part of the service profile of each mobile station in the subscriber tracing class and is transferred to the serving exchange in the usual manner (i.e., when the service profile is requested by the serving exchange or changed by the home exchange). Individual tracing is activated or deactivated for any subscribers in the tracing class by operator commands in the home system.

For the purpose of tracing on a regional basis, the regions to be traced may be marked by a region activity tracing (RAT) parameter in the controlling MSC. Regional tracing will be activated when a subscriber makes an access in a RAT-marked region. Activation of tracing in a particular region activates the tracing for all active subscribers in this region, including any subscribers in the tracing class. Thus, activation on a regional basis also activates tracing on an individual basis for each subscriber in the tracing class which makes an access in the activated tracing region. The serving exchange informs the home system of the activation of tracing for any home subscriber which is roaming in the area of the serving exchange. Regional tracing will be deactivated automatically for a subscriber being traced on a regional basis as soon as the subscriber makes an access from a non-RAT-marked region.

In conventional cellular systems, some of the mobile station activities in a visited system (e.g., the first registration or the first originating call) are always reported to the home system. According to the present invention, however, whenever the subscriber tracing class is activated, the serving exchange will continuously report to the home system all mobile activities which have been selected for tracing. This information may be sent to the home system as part of the automatic roaming signalling which conveys information on the various mobile activities in the visited system (e.g., the Registration Notification, Registration Cancellation, Remote Feature Control, and Cellular Subscriber Station Inactive messages specified in IS-41). The activity reporting is terminated when the tracing is deactivated by operator commands (or the expiration of a tracing timer) in the home system, or by the mobile station making an access in a region not marked by RAT.

In general, the tracing function provided by the present invention operates as follows. Initially, the home system activates the tracing function and specifies the activities to be traced. The subscribers requiring tracing are then assigned to the mobile activity tracing (MAT) class by inserting the MAT parameter in their service profiles. When a subscriber roams outside of the home exchange, the tracing class is forwarded to the serving exchange along with the other information in the subscriber's service profile. In the serving exchange, the regions selected for tracing are marked by the RAT parameter. When a mobile activity selected for tracing is detected and the subscriber's tracing class is activated, the serving exchange immediately reports this activity to the home system. When a mobile roams into a region which has its RAT parameter activated, the serving exchange activates tracing for this subscriber and begins reporting the mobile activities to the home system. The regional tracing is deactivated when this subscriber makes an access from a region which is not being traced. The home system checks all signalling related to the activities specified for tracing and gathers the data elements required for fraud analysis. These data elements should include information sufficient to identify the subscription (e.g., MIN/ESN) and information relating to the activity status (e.g., activity type, activity time, activity location, dialled number, etc.).

Figure 14:
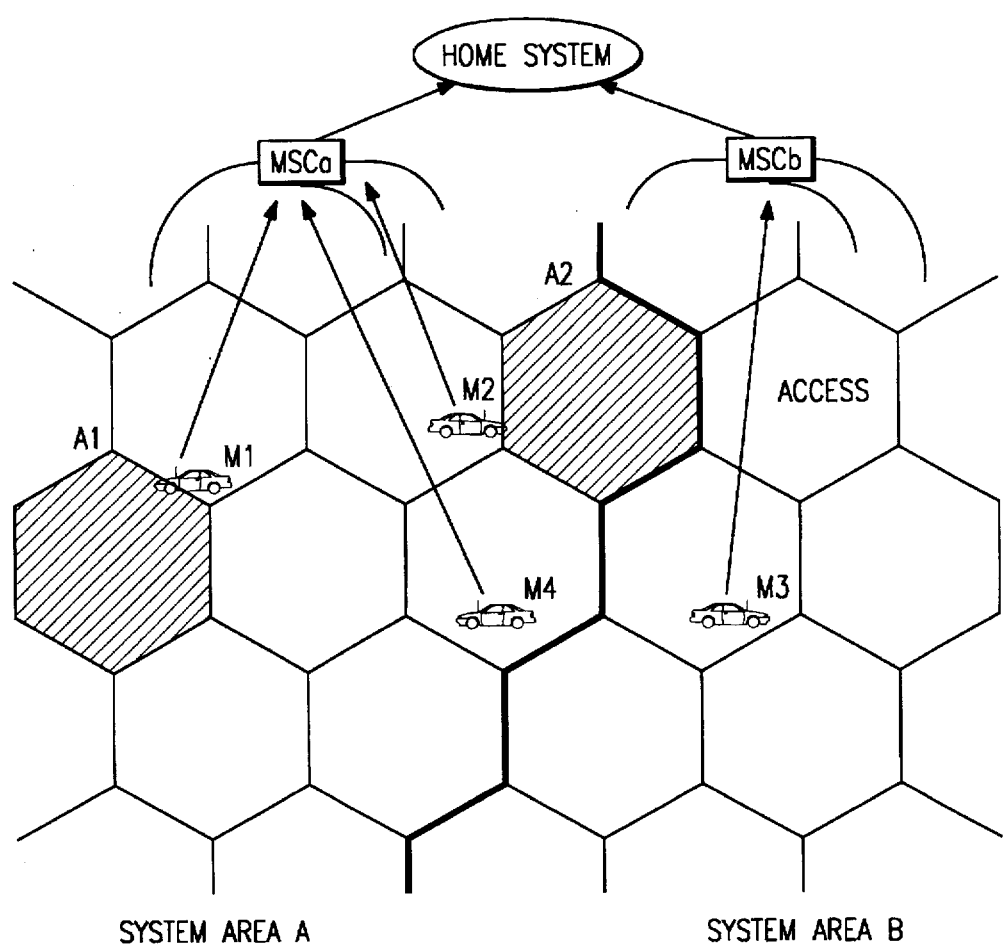
FIG. 14 is a pictorial illustration of subscriber activity tracing in accordance with the present invention.

Referring next to FIG. 14, an illustration of subscriber activity tracing in accordance with the present invention may now be seen. Four mobile stations M1–M4 are shown in FIG. 14 to be roaming in the service area of MSCa or MSCb. Mobile stations M1–M3 are assumed to be registered in MSCa, while mobile station M4 is assumed not to be registered with either MSCa or MSCb. In this example, M1 and M2 are assumed to be subscribers from the home system which are now roaming in the service area of MSCa. The home system is assumed to have assigned both M1 and M2 to the tracing class and to have specified tracing for two activities, originating calls and registrations. In MSCa, tracing has been activated for cells A1 and A2 (shown as shaded regions).

With continuing reference to FIG. 14, M1 originates a call while in the service area of MSCa. Since M1's tracing class is activated, MSCa reports this activity to the home system along with information such as M1's current location, the time of call origination, and the dialed number. This activity information is logged in a format suitable for later processing in the home system. Subsequently, MSCb detects a registration from M3 which is assumed to have the same identity as M1. Since MSCb has no subscriber record for M3 (M3 was assumed to be registered with MSCa), the subscriber profile (including the tracing class) is fetched from the home system. When the registration is accepted, a registration notification is sent to the home system with the tracing-related data. This activity is also logged in the home system. The home system continues to record the data related to the specified activities of the subscriber in a similar manner.

To illustrate regional (in this case, cell-based) tracing, assume that M2 roams into cell A2, in which tracing is activated, and originates a call. MSCa receives the call and checks the subscriber profile for M2 (M2 was assumed to be currently registered with MSCa which, therefore, already has the subscriber profile). From the subscriber profile, MSCa determines that M2 is assigned to the tracing class. Since M2 has placed a call from a region (the cell A2) which is being traced, MSCa automatically activates tracing for M2 and informs the home system. The home system then begins logging M2's activities. Assume that M4, which has the same identity as M2, originates a call from another cell that is not being traced. MSCa then deactivates tracing for M2 and reports this to the home system along with the originating access information. This activity is also logged in the home system. If M2 makes another access at some later time from the traced cell A2, the activity will be logged in a similar manner. The logging of M2 activity traces by the home system could continue until interrupted by an operator command or the expiration of a tracing timer in the home system, or by the detection of an access from M2 or M4 in a region in which tracing is not activated.

Figure 15:
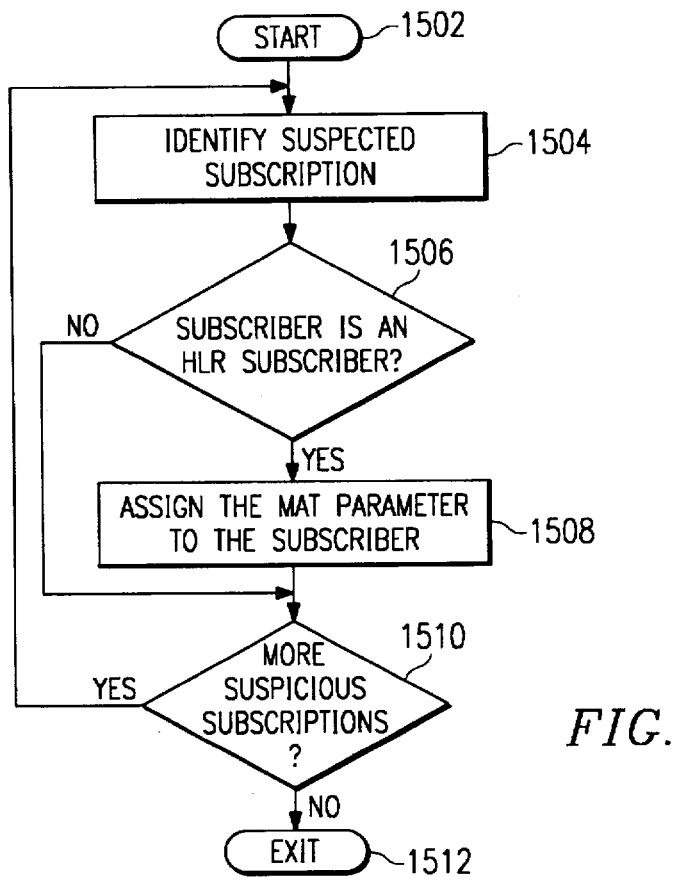
FIG. 15 is a flowchart illustration of the marking of subscribers for tracing in accordance with the present invention.

Referring next to FIG. 15, the process for assigning subscribers to the tracing class in the home system may now be seen. The process begins at step 1502 and then proceeds to step 1504 where a suspicious subscription is selected from a subscriber tracing list. A given subscription could become listed, for example, as a result of scrutiny under one or more of the fraud detection mechanisms of the present invention. At step 1506, the home system determines whether the subscriber selected from the list is a home subscriber. If the selected subscriber is not a home subscriber, the home system jumps to step 1510. However, if the subscriber is a home subscriber, the home system moves to step 1508 and assigns the home subscriber to the MAT class. From step 1508, the home system goes to step 1510 and determines whether more suspicious subscriptions exist in the list. If more suspicious subscriptions exist, the home system returns to step 1504. However, if there are no more suspicious subscriptions to be traced, the home system goes to step 1512 and exits the MAT assignment process.

Figure 16:
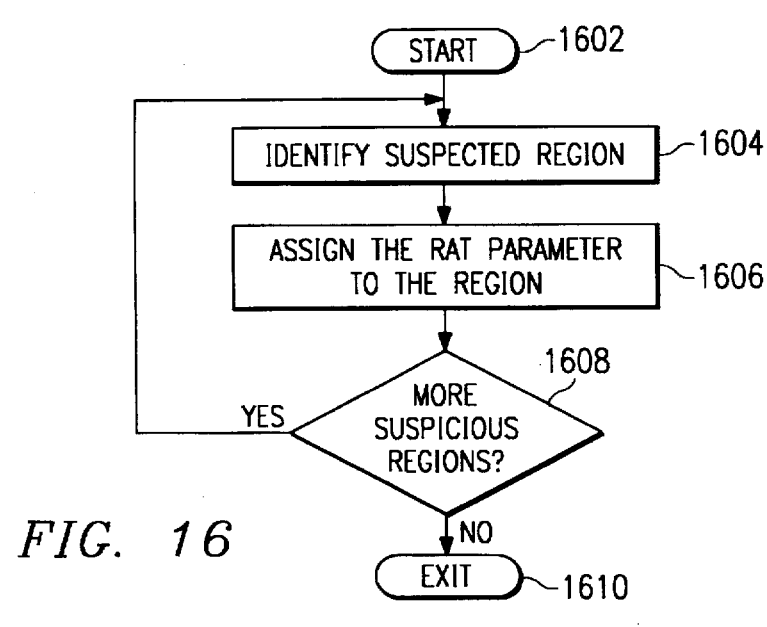
FIG. 16 is a flowchart illustration of the marking of regions for tracing in accordance with the present invention.

Referring next to FIG. 16, the process for activating tracing in regions (cells or location areas) within the service area of a system may now be seen. The system begins at step 1602 and then moves to step 1604 where a suspicious region is selected from a region tracing list. A given region could become listed, for example, if an unusually high number of mobile stations are reported to have been stolen in this region. At step 1606, the system assigns a region activity tracing (RAT) parameter to the selected region to mark it as a fraud region. At step 1608, the system determines if more suspicious regions exist in the list. If more suspicious regions exist in the list, the system goes back to step 1604. However, if no more suspicious regions are left, the system exits the RAT assignment process at step 1610.

Figure 17:
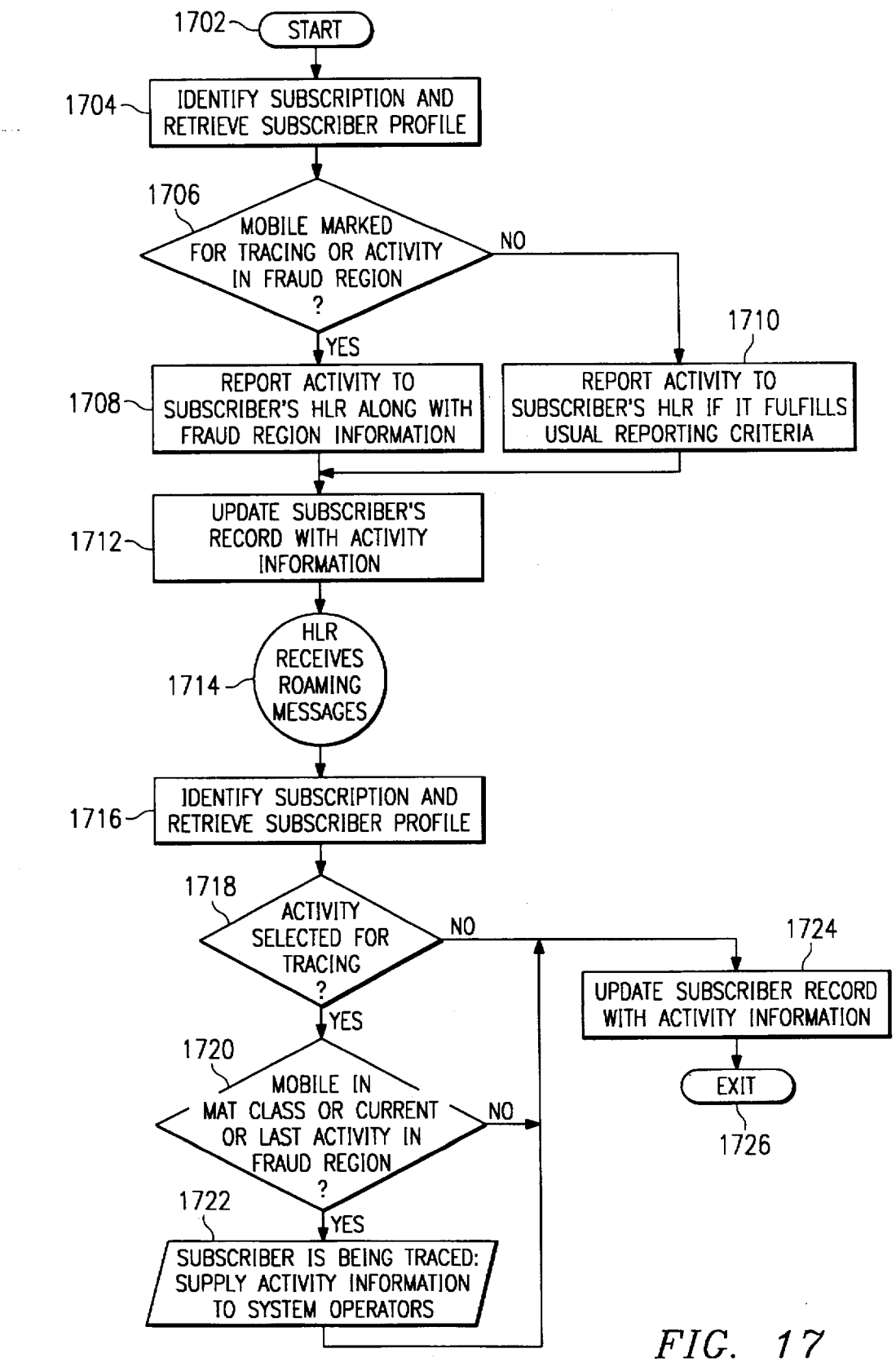
FIG. 17 is a flowchart illustration of the subscriber activity tracing of the present invention.

Referring next to FIG. 17, a flowchart depicting the interaction between a serving system and a home system during subscriber activity tracing in accordance with the present invention may now be seen. The tracing function is invoked at block 1702 when the serving system detects an activity (access) from a mobile station. At step 1704, the mobile station is identified as a roaming subscriber and its service profile is retrieved from the home system. At step 1706, the system determines whether the mobile station is marked for tracing (MAT assigned to the mobile station) or whether the access was detected from a fraud region (RAT assigned to the region).

If the mobile is not marked for tracing and the access was not detected from a fraud region, the system goes to step 1710 and reports any information on this access which is usually transferred to the home system (e.g., information on the first registration or first originating call access). The serving system then moves to step 1712 where it updates its internal subscriber record with relevant activity information (e.g., mobile identity, activity type, activity location, activity time, etc.). If, at step 1706, it is determined that the mobile is marked for tracing or that its activity originated in a fraud region, the serving system moves to step 1708 and reports the activity and relevant fraud-related information (e.g., mobile identity, activity type, activity location, activity time, etc.) to the home system. The serving system then goes to step 1712 where it updates its subscriber record with similar activity information.

At step 1714, the home system receives the activity information which was reported by the serving system at step 1708 or 1710. As described earlier, this activity information may be conveyed through automatic roaming messages. At step 1716, the home system identifies the subscription and retrieves the subscriber profile. At step 1718, the home system determines whether the reported activity is selected for tracing. If the activity is not selected for tracing, the home system jumps to step 1724 and updates the subscriber record with the received activity information. The home system then moves from step 1724 to step 1726 and returns to processing other tasks.

If, at step 1718, it is determined that the activity is, in fact, selected for tracing, the home system moves to step 1720 and determines whether the mobile has been assigned to the tracing class (MAT included in service profile) and whether the current or last reported activity originated from a fraud region. If it is found that the mobile is in the tracing class, or that the current or last reported activity originated from a fraud region, the home system goes to 1722. At step 1722, the home system supplies information concerning the mobile's activity to the system operator for subscriber activity tracing purposes. The home system then moves to step 1724 and updates the subscriber record with the received activity information. The home system also moves directly to step 1724 if, at step 1720, it finds that the mobile is not in the tracing class, or that the current or last reported activity did not originate from a fraud region. From step 1724 the home system moves to step 1726 and returns to processing other tasks.

Fraud Handling

When subscription abuse is discovered in accordance with the techniques of the present invention, the affected system operator has several options for response. For example, the system operator may choose to bar the suspected subscriber from making or receiving any calls or to restrict him or her from making long distance calls until the location or authenticity of the mobile station can be verified either by contacting the subscriber directly or by using one or more of the techniques described earlier (e.g., operator initiated-locating or subscriber activity tracing). Once subscription abuse is confirmed, the system operator can assign a new MIN to the legitimate subscriber and/or have the ESN of his or her mobile station changed. The system operator may then include the fraudulent ESN in a "barring list" to deny service permanently (note that barring ESN may not be suitable if ESN tumbling is being used since a tumbler can pick any valid MIN/ESN combination in the system and, over time, the entire range of valid ESNs could be barred, at least in theory).

Salient Features

A network enhanced with one or more of the anti-fraud features of the present invention, including the multiple access, activity collision and premature registration fraud detection mechanisms, the auditing, operator-initiated locating and the subscriber activity tracing, will allow system operators to:

(a) Detect and obtain a report of suspected fraudulent activities.

(b) Trace the activities of specific subscribers.

(c) Identify and gather data elements concerning the fraudulent and/or the traced activities for further analysis.

(d) Locate a mobile's position in the network without notifying the subscriber.

(e) Improve the subscriber service that may be affected by roamer agreement cancellations.

(f) Receive an indication of the extent of the fraud problem.

(g) Receive real time information on where and when fraud occurs.

(h) Reduce the monetary loss incurred.

(i) Discourage fraud as carriers gradually deny services.

(j) Attract additional subscribers and sustain the existing subscriber base since the anti-fraud enhanced system is more secure, intelligent and commercially more attractive.

It will be readily appreciated by one skilled in the art that the anti-fraud techniques of the present invention may be used in combination or independently of each other. It will also be appreciated that the foregoing detailed description shows only certain exemplary embodiments of the present invention and that many modifications and variations may be made to these exemplary embodiments without departing substantially from the spirit and scope of the present invention. Accordingly, the forms of the invention described herein are exemplary only and are not intended as a limitation on the scope of the invention as defined in the following claims.

What is claimed is:

1. In a cellular radio telephone system including an exchange in communication with a plurality of mobile stations over a plurality of radio frequency (RF) channels including at least one voice channel and at least one control channel, a method for detecting fraud in said system comprising the steps of:

receiving at said exchange a system access over a control channel of said system;

identifying which mob fie station is making said system access;

determining whether the identified mobile station is indicated to be currently connected to a voice channel of said system;

if the identified mobile station is indicated to be currently connected to said voice channel, sending to the identified mobile station an audit order over said voice channel for the purpose of verifying whether the identified mobile station is still connected to said voice channel; and detecting fraud if a response to said audit order is received from the identified mobile station over said voice channel, thus verifying that the identified mobile station is still connected to said voice channel.

2. The method of claim 1 wherein said system access comprises a registration, a call origination, a solicited page response, an unsolicited page response, or a service call.

3. The method of claim 1 wherein said step of determining whether the identified mobile station is indicated to be currently connected to a voice channel of said system comprises the step of determining whether the identified mobile station is marked "busy" in a home location register (HLR) connected to said exchange.

4. A method for detecting fraud in a radio communications network comprised of a plurality of systems serving a plurality of mobile stations, the method comprising the steps of:

receiving at one of said systems a request for service from one of said mobile stations;

determining whether said one mobile station is indicated to be actively receiving service in another one of said systems;

if said one mobile station is indicated to be active in said other system, sending to said one mobile station an audit order over a voice channel of said other system for the purpose of verifying whether said one mobile station is still active in said other system; and detecting fraud if a response to said audit order is received from said one mobile station over said voice channel, thus verifying that said one mobile station is still active in said other system.

5. The method of claim 4 wherein:

said network comprises a home system of said one mobile station and a plurality of visited systems in which said one mobile station can roam;

said service request is received at a first one of said visited systems; and said one mobile station is determined to be active in a second one of said visited systems.

6. The method of claim 5 wherein:

said first one of said visited systems sends to said home system a notification of having received said service request from said one mobile station;

upon receiving said service request notification, said home system determines that said one mobile station is indicated to be active in said second one of said visited systems and sends thereto a notice to cancel service to said one mobile station;

upon receiving said cancellation notice, said second one of said visited systems determines that said one mobile station is indicated to be actively receiving service therefrom and sends an audit order to said one mobile station; and fraud is detected if said second one of said visited systems receives a response to said audit order.

7. The method of claim 6 wherein said service request is a registration, a call origination, a solicited page response, an unsolicited page response, or a service call.

8. The method of claim 6 wherein said home system includes a home location register (HLR) for storing information on the activities of said one mobile station.

9. The method of claim 6 wherein said second one of said visited systems sends to said home system an indication of whether said response was received from said one mobile station.

10. A method for detecting fraud in a cellular network including a plurality of mobile stations subscribing service from a home system and capable of receiving service in a plurality of other systems, said home system maintaining a register of which systems are currently serving said mobile stations, the method comprising the steps of:

receiving at said home system a notification that one of the other systems has received a service request from one of said mobile stations;

determining at said home system whether the other system which received said service request is the same as the system which is registered to be currently serving said one mobile station;

if the other system is different from the registered system, sending from said home system to the registered system an order cancelling service to said one mobile station;

determining at said registered system in response to the receipt of said order the current activity status of said one mobile station;

if said one mobile station is indicated to be currently active in said registered system, sending to said one mobile station an audit order over a voice channel in said registered system for the purpose of confirming that said one mobile station is still active in said registered system; and detecting fraud if an audit response is received from said one mobile station over said voice channel, thus confirming that said one mobile station is still active in said registered system while also indicated as being active in the other system.

11. The method of claim 10 wherein the step of determining whether the other system is the same as the registered system comprises the step of determining whether the other system is the same as that indicated by a temporary location (TLOC) register for said one mobile station in said home system.

12. The method of claim 10 further comprising the step of reporting to said home system whether or not said audit response was received from said one mobile station in said registered system.

13. A method for detecting fraud in a radio communications system in which a plurality of mobile stations periodically register with said system on the basis of a comparison between the current value of a registration identification (REGID) periodically transmitted from said system and the current value of a next registration (NXTREG) stored in each of said mobile stations, said NXTREG value in each mobile station being updated at each periodic registration by that mobile station with the sum of the then-current value of REGID and the value of a registration increment (REGINCR) transmitted from said system, the method comprising the steps of:

determining the difference between the values of REGID for two registrations received by said system from a particular mobile station;

comparing the REGID difference between the two registrations with the value of REGINCR; and detecting fraud if the REGID difference between the two registrations is less than the REGINCR value.

14. The method of claim 13 wherein said two registrations are consecutive periodic registrations.

15. The method of claim 13 wherein each mobile station also updates its NXTREG value at each call origination or reception.

16. The method of claim 13 wherein:

said system comprises a plurality of location areas; and the two registrations are received from said particular mobile station within the same location area of said system.

17. A method for detecting fraud in a radio communications system in which a mobile station periodically registers with the system on the basis of a comparison between the current value of a registration identification (REGID) periodically transmitted from said system and the current value of a next registration (NXTREG) stored in said mobile station, said NXTREG value being updated at each periodic registration with the sum of the then-current value of REGID and the value of a registration increment (REGINCR) transmitted from said system, the method comprising the steps of:

storing the value of REGID at the time at which a first registration from said mobile station was received by said system;

estimating the value of REGID at the expected time of arrival at said system of a second registration from said mobile station as the sum of the REGINCR value and the stored REGID value;

determining the value of REGID at the actual time of arrival at said system of said second registration from said mobile station;

comparing the estimated REGID with the actual REGID value for said second registration; and detecting fraud if the actual REGID value is less than the estimated REGID value for said second registration.

18. The method of claim 17 wherein said first and second registrations are consecutive periodic registrations.

19. The method of claim 17 wherein said mobile station also updates the NXTREG value at each call origination or reception.

20. The method of claim 17 wherein:

said system comprises a plurality of location areas; and said first and second registrations are received from said mobile station within the same location area of said system.

21. In a radio communications network, a method for locating a mobile station suspected of fraud comprising the steps of:

selecting an area to be searched for said mobile station;

issuing an audit order on a voice channel in said area for said mobile station;

detecting an answer to said audit order on said voice channel from said mobile station; and determining the location of said mobile station based upon the location from which said answer was detected.

22. The method of claim 21 wherein:

said network comprises a home system for said mobile station and at least one other system; and said home system selects said search area.

23. The method of claim 22 wherein said search area is in another system and said home system sends to said other system a request to audit said mobile station in said search area.

24. The method of claim 22 wherein said search area is selected through operator commands or is set to a default search area comprising the last registered area for said mobile station.

* * * * *